United States Patent Office 3,649,608
Patented Mar. 14, 1972

3,649,608
PROCESS FOR THE PRODUCTION OF SHAPED ARTICLES, PARTICULARLY DENTAL PROSTHESES
Heino Logemann and Paul-Gunther Bruckmann, Leverkusen, Germany, assignors to Farbenfabriken Bayer Aktiengesellschaft, Leverkusen, Germany
No Drawing. Filed July 23, 1969, Ser. No. 844,158
Claims priority, application Germany, July 23, 1968,
P 17 69 840.7, P 17 69 839.4
Int. Cl. C08f 15/18
U.S. Cl. 260—885
23 Claims

ABSTRACT OF THE DISCLOSURE

A process for use in the production of dental prostheses, wherein 25–27 parts by weight of a liquid consisting predominantly of monomeric methyl methacrylate and 73–75 parts by weight of a polymer powder are mixed together. The use of a polymer powder comprising 85–60 parts of a polymer of methacrylic acid and 40–15 parts of an acrylic acid ester/methyl methacrylate or methacrylic acid ester/methyl methacrylate copolymer, where the ester content in the copolymer, the molecular weight of the polymer and copolymer, and the particle size of the polymer and copolymer are required to be within specified ranges results in a rapid start of processing and a processing time of at least an hour.

---

Synthetic materials for the production of dental prostheses are now predominantly prepared according to the powder-liquid process (German patent specification No. 737,058, Kulzer). A fine-particle polymer powder, usually a bead polymer, which generally consists of polymethacrylic acid methyl ester is formed into a paste in a crucible with a liquid predominantly consisting of monomeric methacrylic acid methyl ester in a ratio of 2–3 parts of powder to 1 part of liquid. The hollow mould of plaster present in a two-part dental flask is usually isolated with an aqueous sodium alginate solution. The paste of powder and monomeric liquid is then introduced, the dental flask is closed by compression and the contents are completely polymerised at elevated temperature, usually on a boiling water bath, with the aid of benzoyl peroxide added to the powder. The good physical properties of the polymethacrylic acid methyl ester and the easy handling have caused the process to develop into a standard technique of dental prosthetics. Some advances made in the course of time have further improved the technique. A substantial consideration is the processing property. Initially the powder consisted of a pure polymethacrylic acid methyl ester. A finely divided powder of this compound swells in monomeric methacrylic acid methyl ester only after about 18–20 minutes to such an extent that a plastic paste is formed which is readily workable. After a further 15 minutes, the paste has already become so tight and scabby that it is no longer usable. Even within the processing range of 15 minutes, the plasticity of the mass changes constantly; it is therefore not very easy to catch the desired moment for precision work, and in cases where embedding is difficult there is not sufficient time, the more so as the available periods of time become even shorter at an elevated room temperature. The initial attempt to improve matters by the addition of plasticisers, such as e.g. phthalic acid dibutyl ester, understandably, proved to be not very successful. The next step for developing an improved processing technique logically consisted in using copolymers, instead of a methacrylic acid methyl ester homopolymer; the improvements thus achieved in respect of processing range and also in the consistency of the paste were already remarkable. The finer the particles of the polymer powder, the faster the paste became workable, but the processing range decreases. Mixtures of a polymer powder of predominantly pure polymethacrylic acid methyl ester with a copolymer of methacrylic acid methyl ester and another vinyl or divinyl compound, primarily an acrylic acid ester or a methacrylic acid ester of a higher alcohol, have permitted of a processing range of one hour or more (German patent specification No. 940,493). There resulted not only a substantial improvement of the flow, but the consistency of the paste changed much more slowly within the period of time of one hour; consequently, the man skilled in the art can more easily select the consistency adequate to the work concerned and he has sufficient time to carry out several, even complicated tasks in succession with one pasting operation.

The volume of the monomeric component decreases during polymerisation. The addition of a polymer powder as filler reduces the shrinkage. Consequently, the largest possible amount of polymer powder should be present. The contraction is considered acceptable when three parts by weight of powder are present for every part of monomer, and this proportion should therefore be observed as accurately as possible. Although the manufactures of materials for the production of dental protheses supply directions and usually also auxiliaries for measuring the powder and liquid, it is frequently the custom in practice to dose both ingredients by eye according to the absorption power of the powder for the liquid. It has hitherto not been possible to produce a powder which could be automatically strewn in in such a high proportion, which could be processed within three to four minutes or less while, on the other hand, having a workability of at least one hour, and which also yielded a satisfactory consistency of the paste.

It has now been found that an optimum of all the processing properties, i.e. an automatic strewability of 73–75 parts by weight of powder per 27–25 parts by weight of liquid, a rapid start of processing of 2–4 minutes, a range of processing of one hour, a paste which has a good flow and the consistency of which changes only very slowly, can be achieved by using as the powdery component a mixture prepared in a ratio of 85–60, preferably 80–70 to, Parts of (1) a preferably bead-shaped polymer of methacrylic acid methyl ester containing from 0 to 2% of an additional comonomer and having a K-value of 75–120, preferably 80–100, and a sieve analysis of at least 98% particles which are smaller than $125\mu$ and more than 50% of particles which are larger than $63\mu$, Per 15–40 preferably 20–30 parts, of (2) one or more preferably bead-shaped copolymers which are synthetised from 15–30, preferably 20–25, parts by weight of one or more acrylic acid esters, the balance being methacrylic acid methyl ester, and 0 to 5% of a further comonomer, and which have a K-value of between 76 and 95 and a sieve analysis of at least 15%, preferably not more than 80%, of particles above $100\mu$, or (2A) One or more bead-shaped copolymers which are synthetised from 18–30 parts by weight, preferably 20–25 parts by weight, of one or more methacrylic acid esters with 7–14 carbon atoms in the alcohol residue (possibly in mixture with minor proportions of other (meth)-acrylic acid esters) and the balance being methacrylic acid methyl ester with 0 to 5% by weight of a further comonomer, and which have K-value between 76 and 80 and a sieve analysis of at least 10%, preferably more than 25% of particles above 80µ, or K-value between 80 and 90 and a sieve analysis of at least 25% of particles above 80µ, or (2B) One or more bead-shaped copolymers which are synthetised from 20–50 parts by weight, preferably 35–40 parts by weight, of one or more methacrylic acid esters with 4–6 carbon atoms in the alcohol radical (possibly in mixture with minor proportions of other (meth)acrylic acid esters) and the balance being methacrylic acid methyl ester with 0 to 5% by weight of a further comonomer, and which have K-value between 76 and 95 and a sieve analysis with at least 15%, preferably at least 25%, of particles above 80µ.

The K-value is a measure of the viscometric molecular weight. The viscosity of a 0.5% solution of the polymer in chlorobenzene is measured at 25° C., and the result is expressed in the form of the K-value which is virtually independent of the concentration, according to H. Fikentscher, Cellulosechemie 12 (1932), 60.

The desired simultaneous peak in all the processing properties is thus achieved by determining in the components of the mixture within certain limits the chemical composition as well as the molecular weight and also the particle size. The copolymer is usually coarser than the homopolymer.

Suitable polymer powders for the homopolymer of methacrylic acid methyl ester as well as for the copolymer are primarily bead polymers, although admixtures of e.g. splinter polymers are not excluded. In the examples the sieve analyses have been carried out with test sieves according to DIN standard. The polymers produced according to conventional processes for bead polymerisation give a distribution curve which can be illustrated in a logarithmic granulation net by a straight line. Any deviations which may be caused by special operations are to be related thereto.

For use in forming the copolymers, the acrylic acid esters preferably comprise the esters of acrylic acid with simple aliphatic alcohols containing 1–15 carbon atoms, especially 1–8 carbon atoms, and the methacrylic acid esters preferably comprise esters of methacrylic acid with simple aliphatic alcohols containing 4 to 14 carbon atoms, but a more or less substantial content of more unusual alcohols, e.g. of cyclohexanol or tetrahydrofurfuryl alcohol is not excluded. On the other hand, polyhydric alcohols would essentially change the picture, even if admixed in very small amounts.

It has been known for a long time to use mixtures of different polymers for the powder-liquid process. For example, U.S. patent specification No. 2,569,767, Knock et al., column 5, line 25 seq. remarks on the use, in particular, of dichlorostyrene as monomeric liquid that polymers with different solubilities in the monomer can be used in order to influence the consistency of the physical form of the mixture prepared: "For example, a mixture of a polymer of low solubility in the monomer with a polymer of high solubility often yields the desired consistency when a single polymer of the same solubility characteristics is ineffective. Approximately the same result can sometimes also be achieved with a mixture of components of one and the same polymer of different particle sizes." And further on in column 11: "Excellent results are achieved when different low molecular polymers are mixed with their higher molecular polymers to give a mixture of the desired dissolving speed."

An addition of 3 or 15% polymethacrylic acid butyl ester is contained, for example, in U.S. patent specification No. 2,468,094, Marks, Example 5, and in U.S. patent specification No. 2,326,531 of Gates; and similarly also in U.S. patent specification No. 2,321,048 of Schildknecht.

According to U.S. patent specification No. 2,466,040, S. Myerson, special colour effects are achieved when a coloured polymer powder is mixed with an uncoloured powder, e.g. in a ratio of 1:1, the coloured powder preferably having finer particles. In general, however, it is still common use to add the colour pigments as such to the powder mixture or subsequently to cause them to adhere to the surface of the powder particles, that is to say not to use specially coloured polymer components.

In German patent specification No. 940,493 a bead-shaped homopolymer of methacrylic acid methyl ester is mixed, as already mentioned above, with a finely divided copolymer of methacrylic acid methyl ester and acrylic acid esters or butadiene or methacrylic acid esters of alcohols with more than 4 carbon atoms. The copolymer is characterised by the property of swelling with monomeric methacrylic acid methyl ester within a shorter time than the homopolymer, due to the degree of dispersion and the chemical composition. In the usual range of particle size from 20µ to about 200µ this will apply to all copolymers in a similar granulation range as the homopolymer. It can be seen from the examples of German patent specification No. 940,493 that it relates in the first place to copolymers which were to be more finely divided than the homopolymer. It is true, that Example 1 mentions a copolymer of 80 parts by weight methacrylic acid methyl ester and 20 parts by weight methacrylic acid dodecyl ester of an average bead diameter of 0.1 mm. which is mixed with a homopolymer of 0.07 mm. However, this is a typing error which was overlooked. The text of the application which was subsequently restricted states: "-dodecyl ester with a K-value of 70 and an average bead diameter of such a size that this copolymer alone with the monomer forms virtually at once a kneadable mass which . . . ," and the English text (British patent specification No. 760,344) states 0.02 mm.

The content of German patent specification No. 940,493 appears also in U.S. patent specification No. 2,947,716 (=German published specification No. 1,251,948 published Oct. 12, 1967), restricted to a copolymer with 7.5–40% by weight acrylic acid ethyl ester in an admixture of 7.5 to 48% by weight (in U.S. patent specification No. 2,947,716 also acrylic acid methoxy ethyl ester and acrylic acid butoxy ethyl ester). However, no instructions are given for the selection of the particle sizes and molecular weights. In column 5, line 37 of the U.S. patent specification it is stated that other acrylates, e.g. butyl acrylate, are "inoperative" with regard to the invention, so that the application is limited to methoxy ethyl acrylate and preferably ethyl acrylate. Very important is, furthermore, the statement made in the claim of German published specification No. 1,251,948 which corresponds to the hitherto state of the art, that the quantity of monomeric liquid should amount to 50 to 30 parts by weight per 50 to 70 parts by weight of powder. In contrast thereto, the process of the present invention achieves an automatic addition in a proportion of 27 to 25 parts of monomeric liquid to 73 to 75 parts of powder, i.e. very nearly the ratio 1:3.

It is further known that the addition of a polymer of a finer particle size to one of a coarser particle size has the effect that a smaller amount of liquid is required. Austrian patent specification 171,172 in the name of Lonza, Swiss priority June 14, 1948, proposes to add for this purpose a material with a diameter at least six times smaller; that is also described in Swiss patent specification No. 279,640 in the name of Lonza (German patent application L 3646=Austrian Pat. No. 176,360=British patent specification No. 709,983) for cold-setting dental material. However, since nowadays dental materials normally have an average particle size in the range from 50 to 150µ, the addition of such a fine-particle second polymer would have unpleasant side effects; for example, it would cause an unnecessary development of dust, the more so as a polymer as such is always constituted by different fractions according to known rules which depend on the conditions of production.

It has been found and this is substantiated in detail in the examples that various conditions must be observed for the homopolymer and for the copolymer in order to achieve the desired properties of the powder mixture when preparing the paste. Only the combination of the two components, the homopolymer and the copolymer, each with the claimed properties, offers the possibility of achieving all the desired properties of the paste simultaneously. From German patent specification No. 940,493 there is known the effect, which was surprising at the time, that processing times of over one hour can be achieved by admixing copolymers of acrylic acid esters or of methacrylic acid esters containing 4 to 15 carbon atoms with methacrylic acid methyl ester. Copolymers of methacrylic acid methyl ester with acrylic acid esters or methacrylic acid esters of alcohols containing 4–15 carbon atoms, which are composed according to the said patent specification swell by themselves with the monomeric liquid very fast within a few seconds to yield a paste which, if it is at all usable, becomes completely useless within a few minutes. If in the present invention only one factor in the properties of the components is modified, serious disturbances in the property image of the mixture with the monomeric liquid arise at once and all the demands can no longer be met simultaneously. If the molecular weight of the copolymer as well as of the homopolymer is too low, stirring of the powder mixture with monomeric methacrylic acid ester yields a paste which has a wide range of processing, possibly of two hours or more, but the mixture achieves a satisfactory cohesion only after more than 6 minutes. When the powder is added to the monomeric liquid, a moist, loose, "sugary" mass is initially obtained in these cases which becomes cohesive only after mixing for a prolonged time, which is slow to become detached from the crucible wall and loses its tackiness even later. When the molecular weight of both components, especially of the copolymer, is increased, the paste attains a consistency suitable for processing within a much shorter time.

Spatulating can be starting immediately after mixing the powder with the liquid since, due to the higher viscosity of the dissolved and swollen components, the mass becomes almost immediately cohesive. On the other hand, the tackiness caused by the swelling and dissolving disappears much more rapidly so that the mass soon becomes detached from the crucible wall and rapidly matures to form a homogeneous smooth and velvety supple paste of a good compression consistency. If the molecular weights of both components lie within the stipulated range, but the copolymer is more finely divided than according to the present invention with a normal distribution of granular sizes, then the powder cannot be strewn into the liquid to the desired extent and the paste becomes too tight, especially in the upper range of the molecular weights. On the other hand, the finest possible granulation is desired for the homopolymer, in order to achieve a supple, velvety paste the structure of which is not noticeable during kneading, the lower limits being determined by the demand for automatic addition. Furthermore, too coarse a polymer would give macroscopically recognisable grain edges, especially in the coloured state, and poorer physical properties in the finished prosthesis. When the molecular weight of the copolymer as well as of the homopolymer are sufficiently high for the paste to be workable within two to four minutes, an automatic addition ratio of three parts of powder for every part of monomeric liquid and the desired workability of one hour are achieved only if the conditions stated in the claim for the sieve analysis are met for the copolymer as well as for the homopolymer. When the molecular weight is further increased, the limits are determined by the fact that an increasing molecular weight of the copolymer causes the spatulated mass to become rough and too tight sooner than does that of the homopolymer, that the mixed paste acquires an increasingly elastic, loose or "cotton wool-like" feel after a short time, and that the time available for processing falls below the value of one hour. Accordingly, limits are defined by the content of acrylic acid ester or methacrylic acid esters of higher alcohols in the copolymer; if the content is too low, the swelling power becomes too low, if it is too high, the swelling power becomes too strong. If, therefore, any of the requirements according to the present invention for the homopolymer and the copolymer are not carefully followed, the properties of the material immediately become more unfavourable in one or several respects. An optimum can only be achieved by the combined effect of all the properties of the powder mixture in strict accordance with the invention.

Even within the defined range, smaller gradations are still recognisable. For example, a coarser particle size will be chosen for the copolymer as the proportion of acrylic acid ester or methacrylic acid ester of high alcohols in the copolymer and the molecular weight increase. Consequently, a certain range of validity exists for the stated parameters, within which they remain applicable. However, only their sum total gives the possibility of simultaneously combining all the properties mentioned above in the product.

Finally, a compensation of the properties can also be achieved in some cases by using, within the stated limits, different copolymers of the claimed type at the same time. Furthermore, an addition of plasticizers, such as e.g. dibutyl phthalate, in quantities of up to about 5%, referred to the polymer, are not excluded in principle, although this will generally be omitted. Further additives, such as dyestuffs, lubricants, anti-ageing agents etc., are used in known manner according to the state of the art.

A small proportion of other comonomers, e.g. styrene or vinyl acetate, of not more than 2% in the homopolymer and not more than 5% in the copolymer is admissible.

An appreciable advantage is achieved in many cases when the homogeneous polymer of predominantly pure methacrylic acid methyl ester with K-values of 75–120, preferably 80–100, and a sieve analysis of at least 98% of particles below 125$\mu$ and at least 50% of particles above 63$\mu$ is replaced in the process described above with a mixture of such a polymer with a similar polymer where the diameter is 2 to 5 times smaller. The advantages thus attainable consist in that in these cases coarser homopolymers of methacrylic acid methyl ester can also be used, i.e. those the sieve analysis of which contains at least 99% of particles below 150$\mu$ and at least 50% of particles above 63$\mu$. It is common procedure to mix polymers of the same type but of different granulation, in order to produce mixtures which can be thermoplastically processed, for example, pastes of polyvinyl chloride powder and plasticisers, with the lowest possible proportion of liquid. Austrian patent specification No. 171,172 of May 23, 1949 in the name of Lonza, Swiss priority June 14, 1948 (cf. also Swiss patent specification No. 279,640 in the name of Lonza for cold-setting dental masses) proposes to add a polymer the average particle size of which is at least six times smaller. A polymer of methacrylic acid methyl ester with the range of particle size from about 1–20$\mu$ is not easily produced on an industrial scale, and it would impart a dusty character to the material. Optimum effects are already achieved when 5–50% by weight of the homopolymer of methacrylic acid methyl ester are replaced with a similar homopolymer the average diameter of which is 2–5 times smaller. Not only can the powder be strewn into a smaller amount of liquid, the spatulated paste also becomes more rapidly homogeneous, it is noticeably more supple and smoother, although normally workable for a somewhat shorter period of time, but this is irrelevant when without this measure the range of processing substantially exceeds the period of time of one hour which is hardly ever fully utilized. If, on the other hand, the homopolymer of methacrylic acid methyl ester is finer throughout, the mixture with the copolymer proves to be more difficult to strew in, as described above.

EXAMPLE 1

75 parts by weight and 72.5 parts by weight, respectively, of a bead polymer of pure methacrylic acid methyl ester of K-value 91.8 and the following sieve analysis:

| | Percent |
|---|---|
| Per: | |
| 125μ | 0 |
| 100μ | 14 |
| 80μ | 30 |
| 63μ | 20 |
| 40μ | 20 |
| Through 40μ | 16 | are mixed with 0.25 part by weight benzoyl peroxide and with 25 and 27.5 parts by weight, respectively, of a bead polymer obtained by copolymerisation of methacrylic acid methyl ester and acrylic acid ethyl ester. Each time, 12 g. of the mixture are strewn into 4 g. = 4.25 cc. of monomeric methacrylic acid methyl ester, the weight of the non-absorbed powder is determined, this is returned and the processing properties are determined.

| | Percent acrylic acid ethyl ester in copolymer | K-value of copolymer | Sieve analysis of copolymer per— | | | | | | Processing properties at mixture ratio 75:25 | | | | | | | Processing properties at mixture ratio 72.5:27.5 | | | | | | |
|---|---|---|---|---|---|---|---|---|---|---|---|---|---|---|---|---|---|---|---|---|---|---|
| | | | | | | | | | Residue of added powder, g. | After addition | Paste | | | | | Residue of added powder, g. | After addition | Paste | | | | |
| | | | 160μ | 125μ | 100μ | 80μ | 63μ | 40μ | (?) | | | During mixing | Detached from crucible wall and kneadable after— | Properties of finished paste | Remaining tackiness disappears after— | Paste can be processed at least for— | | | During mixing | Detached from crucible wall and kneadable after— | Properties of finished paste | Remaining tackiness disappears after— | Paste can be processed at least for— |
| 1 | 20 | 80.3 | | | 4 | 44 | 28 | 18 | 6 | 1.1 | Somewhat wet. | Good. | 2'20" | Not inhomogeneous. | 4'30" | 60" | 1.6 | Somewhat wet, dense at the top. | Good, rather tight. | 2'30" | Smooth. | 4'30" | 60' |
| 2 | 20 | 81.8 | | | 2 | 6 | 10 | 42 | 40 | 1.2 | Slightly wet. | Good, rather tight. | 2'40" | Smooth. | | 60" | 1.2 | Wet, dense at the top. | do. | 2'20" | Hardly inhomogeneous then smooth. | 4'30" | 60' |
| 3 | 20 | 82.1 | | 54 | 20 | 18 | 4 | 2 | 2 | 0.0 | Not wet. | Initially somewhat slow to set, then good. | 2'30" | Hardly inhomogeneous, soft. | 5'0" | 60" | 0.1 | Not wet. | Initially easy to spatulate, sugary then good. | 2'30" | Not inhomogeneous, soft. | 4'30" | 60' |
| 4 | 20 | 82.4 | | | 30 | 24 | 8 | 4 | 2 | 0.4 | do. | Initially soft and somewhat moist, not very tight. | 2'50" | Initially somewhat moist, then good and smooth. | 5'30" | 60" | 0.5 | do. | Sets immediately, becomes stringy, not tight, good. | 2'30" | Smooth, rough outside. | 4'30" | 60' |
| 5 | 20 | 84.0 | | | 28 | 30 | 10 | 8 | 4 | 0.6 | Hardly wet. | Good. | 2'45" | Not inhomogeneous, good. | 4'40" | 60" | 1.0 | Wet. | Good, somewhat tighter. | 2'45" | Good. | 5'15" | 60' |
| 6 | 20 | 85.0 | | | 1 | 11 | 24 | 42 | 22 | 1.4 | Wet, tight at top. | Not very light. | 2'50" | Initially somewhat inhomogeneous, then smooth, somewhat rough outside. | 4'15" | 60" | 1.8 | Wet, dense at top. | Rather tight. | 2'55" | Smooth, slightly moist. | 4'15" | 60' |
| 7 | 20 | 89.6 | | 58 | 16 | 14 | 5 | | 8 | 0.2 | Not wet. | Easily spatulated and soft. | 2'20" | Soft, initially rough outside, not granular. | 5'0" | 60" | 0.15 | Not wet. | Easily spatulated, rather soft, sugary, not too viscous. | 2'45" | Not inhomogeneous, not moist, soft. | 4'45" | 60' |
| 8 | 20 | 90.9 | | 54 | 18 | 18 | 6 | 2 | 2 | 0.8 | Slightly wet. | Immediately stringy and rather tight. | 2'20" | Smooth, not granular, soft, somewhat rough outside. | 4'25" | 60" | 1.0 | Wet and somewhat dense. | Stringy, but not tight. | 2'30" | Not inhomogeneous, not granular, tight. | 4'15" | 60' |

See footnote at end of table.

| | | Sieve analysis of copolymer per— | | | | | | | Processing properties at mixture ratio 75:25 | | | | | | | Processing properties at mixture ratio 72.5:27.5 | | | | | | |
|---|---|---|---|---|---|---|---|---|---|---|---|---|---|---|---|---|---|---|---|---|---|---|
| | | | | | | | | | | | Paste | | | | | | | Paste | | | | |
| | Percent acrylic acid ethyl ester in copolymer | K-value of copolymer | 160µ | 125µ | 100µ | 80µ | 63µ | 40µ | (¹) | Residue of added powder, g. | After addition | During mixing | Detached from crucible wall and kneadable after— | Properties of finished paste | Remaining tackiness disappears after— | Paste can be processed at least for— | Residue of added powder, g. | After addition | During mixing | Detached from crucible wall and kneadable | Properties of finished paste | Remaining tackiness disappears after— | Paste can be processed at least for— |
| 9 | 20 | 91.5 | — | 2 | 12 | 36 | 18 | 22 | 10 | 1.8 | Wet and dense at top. | Tight | 2'30" | Initially somewhat inhomogeneous, then smooth, somewhat rough outside. | 4'45" | 60' | 1.8 | Wet and dense at top. | Rather tight. | 2'55" | Smooth, slightly moist. | 4'15" | 60' |
| 10 | 20 | 91.8 | — | 50 | 20 | 20 | 6 | 2 | 2 | 0.8 | Hardly wet. | Immediately stringy, not very tight, tight only at the end. | 2'45" | Briefly inhomogeneous, then nice and smooth. | 4'15" | 60' | 0.9 | Slight wet. | Somewhat rough. | 2'45" | Initially inhomogeneous, somewhat rough outside. | 5'15" | 60' |
| 11 | 20 | 92.7 | — | 66 | 14 | 12 | 4 | 2 | 2 | 0.5 | Wet | Somewhat moist, not tight, good. | 2'30" | Initially inhomogeneous and granular, rough, then rapidly smooth. | 5'0" | 60' | 1.2 | Wet and dense at top. | Immediately stringy, good. | 2'45" | Not very inhomogeneous or moist, rough outside, initially noticeably granular. | 4'30" | 60' |
| 12 | 20 | 96.1 | — | 41 | 24 | 24 | 5 | 4 | 2 | 0.4 | Not wet | Soft | 2'30" | Not inhomogeneous, soft, somewhat rough outside. | 4'0" | 60' | 0.4 | Not wet | Good, less soft, rough outside. | 2'40" | Briefly inhomogeneous. | 4'45" | 60' |
| 13 | 20 | 102.5 | — | 32 | 30 | 25 | 7 | 4 | 2 | 1.3 | Wet, dense at top. | Rough and stringy. | 2'10" | Rough outside, rapidly smooth, not granular, somewhat stiffer. | 4'15" | 45' | 1.1 | ...do... | Viscous | 2'30" | Good | 4'0" | 50' |
| 14 | 25 | 75.0 | — | 10 | 14 | 38 | 22 | — | 16 | 1.75 | ...do... | Tight | 2'30" | Initially inhomogeneous, then smooth. | 7'0" | 60' | 2.35 | Very wet and dense at top. | Rough | 2'40" | Initially moist and inhomogeneous, tacky. | 6'0" | 60' |
| 15 | 25 | 78.5 | — | 69 | 15 | 12 | 2 | — | 2 | 0.2 | Not wet | Good, not soft and not tight. | 2'30" | Not inhomogeneous, smooth. | 6'30" | 60' | 0.75 | Somewhat wet. | Good | 2'30" | Not inhomogeneous, smooth. | 4'45" | 60' |

¹ Through 40µ.

Re: Example 1

It can be seen from the table how the content of acrylic acid ethyl ester in the copolymer, its viscometric molecular weight, given in the form of the K-value, and the granular size influence the processing properties of the mixture of the two components with a monomeric methacrylic acid methyl ester.

The mixtures 1, 2, 6 and 9 are within the claimed range in respect of the content of acrylic acid ethyl ester in the copolymer (20%) and of the molecular weight (K-value of the copolymer 80.3, 81.8, 85.0 and 91.5), but the sieve analyses indicate that the particles of the copolymer are too fine. Consequently, the powder cannot be automatically strewn into the monomeric methacrylic acid methyl ester; 12 g. leave a residue of more than 1 g. Especially if the molecular weight is very low (experiment 3, K-value 82.1) and the particles of the copolymer are coarse, the material can completely by strewn in; as the K-value rises, increasingly coarser particles of the copolymer are required for this purpose. If the K-value is low (experiment 3), the excessively coarse particles have the effect that the spatulated mass initially sets somewhat slowly, that it appears somewhat moist and slightly "sugary," and that also the paste is initially somewhat moist and sometimes initially somewhat inhomogeneous, especially when rapidly kneaded. Consequently, it is of advantage, with a predetermined lower limit of the molecular weight (K-value 76-80), to observe the lower limit of the proportion of copolymer particles above 100μ (15%); as the K-value increases, the proportion of copolymer particles above 100μ may become higher and should eventually reach its maximum at the upper limit of the K-value (95). If the K-value is high and the proportion of copolymer above 100μ (experiment 11 with 80%) is too great, the finished paste eventually exhibits a granular structure which also sets a limit.

If, finally, the K-value rises to above 95 (mixtures 12 and 13) it becomes more and more difficult to strew in all of the powder, the spatulated paste becomes rough and difficult to process, and while it can be kneaded very rapidly, it is workable for less than 60 minutes because it acquires a solid elastic character before that time.

The mixtures 14 and 15 with a content of 25% acrylic acid ethyl ester in the copolymer show that, even with a low K-value of 75.0, the proportion of copolymer above 100μ must not fall below 25% to make the addition possible.

If the properties at a mixture ratio of 27.5 parts by weight of copolymer to 72.5 parts by weight of homopolymer are compared with those at the mixture ratio of 25:75, the first mixture shows throughout that the powder is a trace more difficult to add. On the other hand, the paste is usually somewhat tighter during spatulating, but it is equally smooth and readily workable if the other conditions lie within the defined limits. With a predetermined homopolymer and a copolymer the main properties of which are determined by the claims appended hereto, it is still possible, within these limits, to achieve a certain improvement in one series by a modified mixture ratio between the homopolymer and the copolymer.

EXAMPLE 2

75 and 72.5 parts by weight, respectively, of a bead polymer of pure methacrylic acid methyl ester with the K-values and sieve analyses stated in the table were mixed with 0.25 part by weight benzoyl peroxide and with 25 and 27.5 parts by weight, respectively, of a bead polymer which was obtained by copolymerisation of 80 parts by weight methacrylic acid methyl ester and 20 parts by weight acrylic acid ethyl ester and had a K-value of 82.4 and the following sieve analysis:

| Per: | Percent |
|---|---|
| 125μ | 3 |
| 100μ | 17 |
| 80μ | 32 |
| 63μ | 17 |
| 40μ | 20 |
| Through 40μ | 11 |

Each time, 12 g. of the mixture were strewn into 4 g.=4.25 cc. of monomeric methacrylic acid methyl ester, the weight of the nonabsorbed powder was determined, this was returned, the mixture was immediately spatulated, and the processing properties were determined.

Processing properties at mixture ratio 75:25

| K-value of methacrylic acid ester homopolymer | Sieve analysis of methacrylic acid ester homopolymer per— | | | | | | Residue of added powder, g. | Paste | | | | Residues of tackiness disappear after— | Paste workable at least for— |
|---|---|---|---|---|---|---|---|---|---|---|---|---|---|
| | 125μ | 100μ | 80μ | 63μ | 40μ | (?) | | After addition | During mixing | Detached from crucible wall and kneadable after— | Properties of finished paste | | |
| 1 | 69.7 | 20 | 22 | 28 | 12 | — | 18 | 0.0 | Not wet | Does not combine immediately. | 2'30" | Initially inhomogeneous, soft, tacky, rough outside, slightly granular. | 5'45" | 60' |
| 2 | 73.9 | 37 | 18 | 20 | 10 | 10 | 4 | 0.6 | ——do—— | Combines gradually | 3'10" | Inhomogeneous, tacky, very slightly granular. | 6'0" | 60' |
| 3 | 76.0 | 34 | 18 | 20 | 10 | 12 | 6 | 0.4 | ——do—— | ——do—— | 2'45" | Inhomogeneous tacky. | 5'0" | 60' |
| 4 | 78.7 | — | 6 | 6 | 16 | 46 | 26 | 1.5 | Wet, dense at top. | Viscous and tight. | 2'30" | Smooth | 3'45" | 60' |
| 5 | 83.2 | — | 4 | 20 | 22 | 28 | 26 | 1.4 | Somewhat wet. | ——do—— | 2'20" | ——do—— | 4'0" | 60' |
| 6 | 87.7 | 0 | 2 | 12 | 15 | 36 | 34 | 1.6 | Wet, dense at top. | ——do—— | 2'20" | ——do—— | 4'0" | 55' |
| 7 | 89.9 | 44 | 20 | 19 | 7 | 6 | 4 | 0.9 | Not wet | ——do—— | 3'15" | Inhomogeneous, rough. | 4'0" | 60' |
| 8 | 91.5 | — | 8 | 24 | 22 | 24 | 22 | 0.9 | Somewhat wet. | Good | 2'30" | Smooth | 4'0" | 60' |

See footnote at end of table.

Processing properties at mixture ratio 72.5:27.5

| | Paste | | | | Residues of tackiness appear after— | Paste workable at least for— |
|---|---|---|---|---|---|---|
| | After addition | During mixing | Detached from crucible wall and kneadable after— | Properties of finished paste | | |
| | Not wet | Does not combine immediately. | 2'45" | Initially inhomogeneous, and tacky, slightly granular. | 5'0" | 60' |
| | Very slightly wet. | Combines soon. | 3'0" | Initially inhomogeneous and tacky, very slightly granular. | 5'30" | 60' |
| | ——do—— | ——do—— | 2'45" | ——do—— | 5'0" | 60' |
| | Wet, dense at top. | Viscous and tight. | 2'30" | Smooth | 4'0" | 60' |
| | Somewhat wet. | ——do—— | 2'20" | ——do—— | 3'45" | 60' |
| | Wet, dense at top. | ——do—— | 2'25" | ——do—— | 4'0" | 50' |
| | Not wet | Rough and viscous. | 2'40" | Inhomogeneous, rough. | 5'0" | 60' |
| | Somewhat wet. | Good, somewhat tight. | 2'30" | Smooth | 4'0" | 60' |

Re: Example 2

The table shows the effect caused by a modification of the properties of the admixed homopolymer of methacrylic acid ester, taking as an example a mixture with a copolymer of methacrylic acid methyl ester with acrylic acid ethyl ester which lies within the claimed range in respect of the composition of the monomer, the K-value and the sieve analysis.

The mixtures 1, 2 and 3 contain a very coarse methacrylic acid methyl ester homopolymer with a substantial proportion of particles above 125μ and a comparatively low molecular weight, K-values below 80. The mixture can easily be strewn in, especially at a low K-value, but the paste sets only gradually. When the mass has become detached from the crucible wall and can be kneaded, it is initially inhomogeneous and tacky. The tackiness persists for a comparatively long time; on the other hand, the paste remains workable for more than one hour. The coarse grain of the homopolymer is noticeable during kneading.

The mixtures 4, 5 and 6 are examples of a homopolymer the grain of which is too fine; the molecular weight, the K-values increase: 78.7, 83.2 and 87.7. The powder mixture cannot be added in the desired proportion; the mass is somewhat viscous and tight when spatulated, but yields a smooth paste which is soon workable and remains usable for a satisfactory period of time. The mixture 7 exhibits too coarse a grain of the homopolymer and a higher molecular weight than in the mixtures 1, 2 and 3. The powder can still be strewn in, but the spatulated mass is rough and viscous, the paste is inhomogeneous at first. The mixtures 8, 9 and 10 correspond to the desired properties. The addition properties are good, spatulating is easy; a smooth paste is formed within a short period of time and remains workable for at least one hour. The mixture 11 is a homopolymer with a very high molecular weight, the grain is somewhat too coarse; in the rough and somewhat dry character of the paste and the short duration of workability, the high molecular weight becomes already recognisable as the limit. The mixtures 12 and 13 also relate to homopolymers with a similarily high molecular weight but a finer grain, the proportion of fine particles being even higher in 12 than in 13. The addition property is poor, the paste become more or less rough and the period of time for which it remains usable is reduced.

EXAMPLE 3

75 parts by weight and 72.5 parts by weight, respectively, of pure methacrylic acid methyl ester with a K-value of 91.8 and the following sieve analysis:

| Per: | Percent |
|---|---|
| 125μ | 0 |
| 100μ | 14 |
| 80μ | 30 |
| 63μ | 20 |
| 40μ | 20 |
| Through 40μ | 16 | are mixed with 0.25 part by weight benzoyl peroxide and with 25 and 27.5 parts by weight, respectively, of a bead polymer obtained by copolymerisation of methacrylic acid methyl ester with acrylic acid butyl ester. Each time, 12 g. of the mixture are strewn into 4 g.=4.25 cc. of monomeric methacrylic acid methyl ester, the weight of the non-absorbed powder is determined, this is returned, the mass is immediately spatulated, and the processing properties are determined.

| | Percent acrylic acid butyl ester in co-polymer | K-value of co-polymer | Sieve analysis of copolymer per— | | | | | | | Processing properties at mixture ratio 75:25 | | | | | | | Processing properties at mixture ratio 72.5:27.5 | | | | | | |
|---|---|---|---|---|---|---|---|---|---|---|---|---|---|---|---|---|---|---|---|---|---|---|---|
| | | | 160μ | 125μ | 100μ | 80μ | 63μ | 40μ | (¹) | Residue after addition, g. | Paste | | | Properties of finished paste | Residues of tackiness disappear after— | Paste workable at least for— | Residue after addition, g. | Paste | | | Properties of finished paste | Residues of tackiness disappear after— | Paste workable at least for— |
| | | | | | | | | | | | After addition | During spatulating | Detached from crucible wall and kneadable after— | | | | | After addition | During spatulating | Detached from crucible wall and kneadable after— | | | |
| 1 | 16 | 82.5 | — | 13 | 26 | 35 | 12 | 9 | 4 | 0.5 | Not wet | Sets somewhat slowly, easily spatulated. | 3'0" | Initially slightly moist, then smooth. | 5'1" | 60' | 1.0 | Somewhat wet. | Sets moderately slowly, easily and well spatulated. | 2'45" | Initially slightly inhomogeneous, then smooth. | 5'1" | 60' |
| 2 | 16 | 83.5 | — | 36 | 24 | 19 | 15 | 3 | 2 | 0.55 | Not wet, initially sugary. | Sets slowly, easily spatulated. | 4'0" | Initially slightly moist and inhomogeneous, then smooth. | 5'1" | 60' | 0.65 | Not wet, initially sugary. | Sets slowly, easily spatulated. | 3'45" | Initially inhomogeneous and moist, then soft. | 6'31" | 60' |
| 3 | 18 | 80.4 | 46 | 22 | 8 | 10 | 4 | 5 | 5 | 0.2 | Wet, initially sugary. | Very soft | 3'30" | Initially moist and tacky, at 4'31" no longer wet. | 6' | 60' | 0.0 | Initially sugary. | Soft and moist, tacky. | 3'31" | Initially inhomogeneous, moist, granular feel, at 4'31" rather smooth and moderately tacky. | 6' | 60' |
| 4 | 20 | 80.6 | 2 | 26 | 30 | 26 | 8 | 6 | 2 | 1.0 | Wet | Normal | 2'45" | Moist, but hardly inhomogeneous. | 5'30" | 60' | 0.6 | Somewhat wet. | Normal | 2'21" | Briefly inhomogeneous and moist, rough outside, then smooth, not granular. | 5'0" | 60' |
| 5 | 20 | 81.9 | — | 7 | 4 | 9 | 17 | 39 | 24 | 2.6 | Wet, dense at top. | | 3'0" | Initially inhomogeneous. | 5'0" | 60' | 2.4 | Wet, dense at top, liquid overflow. | | 2'45" | Not inhomogeneous, but very moist and tacky, then smooth. | 4'45" | 60' |
| 6 | 20 | 82.5 | — | 10 | 22 | 34 | 14 | 12 | 8 | 0.7 | Very slightly wet. | Good | 2'45" | Even | 5'30" | 60' | 1.0 | Wet | Viscous and stringy, good. | 2'50" | Initially slightly inhomogeneous and somewhat moist, then smooth. | 4'0" | 60' |
| 7 | 20 | 83.7 | — | 38 | 28 | 22 | 6 | 4 | 2 | 0.6 | do | do | 2'45" | Initially hardly inhomogeneous, good. | 5'0" | 60' | 1.2 | Wet | Good | 2'15" | Initially somewhat inhomogeneous, then smooth. | 5'15" | 60' |

See footnote at end of table.

| | Percent acrylic acid butyl ester in co-polymer | K-value of co-polymer | Sieve analysis of copolymer per— | | | | | | | Processing properties at mixture ratio 75:25 | | | | | | Processing properties at mixture ratio 72.5:27.5 | | | | | |
|---|---|---|---|---|---|---|---|---|---|---|---|---|---|---|---|---|---|---|---|---|---|---|
| | | | 160μ | 125μ | 100μ | 80μ | 63μ | 40μ | (¹) | Residue after addition, g. | Paste | | Detached from crucible wall and kneadable after— | Properties of finished paste | Residues of tackiness disappear after— | Paste workable at least for— | Residue after addition, g. | Paste | | Detached from crucible wall and kneadable after— | Properties of finished paste | Residues of tackiness disappear after— | Paste workable at least for— |
| | | | | | | | | | | | After addition | During spatulating | | | | | | After addition | During spatulating | | | | |
| 8 | 20 | 87.2 | 2 | 34 | 26 | 24 | 8 | 8 | 6 | 0.9 | Wet, somewhat dense at top. | Good | 2′30″ | Initially somewhat inhomogeneous and rough outside, rapidly smooth. | 6′0″ | 60′ | 0.8 | Somewhat wet and at top. | Soft | 2′40″ | Initially somewhat inhomogeneous and rough outside, soft inside, rapidly smooth. | 4′30″ | 60′ |
| 9 | 20 | 88.3 | | 18 | 30 | 30 | 10 | 8 | 4 | 1.0 | Not very wet. | Good, somewhat tight. | 2′21″ | Briefly inhomogeneous and rough outside, then smooth. | 4′0″ | 60′ | 1.7 | Wet | Noticeably tighter. | 2′45″ | Initially briefly inhomogeneous, then rapidly smooth. | 3′45″ | 60′ |
| 10 | 20 | 97.7 | | 40 | 25 | 23 | 7 | 3 | 1 | 0.5 | Hardly wet. | Good | 2′45″ | Not inhomogeneous but initially moist, rather rough outside, dry feel. | 6′0″ | 40′ | 0.5 | Not wet | Good | 2′15″ | Initially noticeably inhomogeneous and rather moist, soft, rough outside, dries fast. | 5′0″ | 40′ |
| 11 | 20 | 115.0 | | 52 | 19 | 19 | 4 | 4 | 2 | 1.2 | Wet and dense at top. | do | 2′30″ | Not tacky, very rough outside. | 3′30″ | 40′ | 1.0 | Wet and dense at top. | Very good | 2′21″ | Not tacky, supple, soon more dry. | 3′15″ | 40′ |
| 12 | 24 | 95.3 | | 14 | 20 | 38 | 18 | 6 | 4 | 2.8 | do | Moist and very rough. | 2′45″ | Briefly inhomogeneous and moist, then smooth and rather tight. | 6′1″ | 60′ | 2.5 | do | Very rough and tight. | 2′45″ | Hardly inhomogeneous, tight, then smooth. | 4′30″ | 50′ |
| 13 | 24 | 120.0 | | 69 | 8 | 11 | 4 | 4 | 3 | 3.8 | do | Hardly to be combined. | 3′0″ | Rather elastic and dry, but first somewhat tacky. | | 60′ | 2.2 | do | Rough, elastic, not to be combined. | | | 40′ |
| 14 | ²15+5 | 83.0 | | 32 | 26 | 26 | 8 | 6 | 2 | 0.6 | Hardly wet. | Good | 2′50″ | Initially slightly inhomogeneous, then good. | 5′0″ | 60′ | 0.6 | Slightly wet. | Good | 2′30″ | Hardly inhomogeneous, good. | 4′1″ | 60′ |

¹ Through 40μ.
² Acrylic acid methylester.

Re: Example 3

It can be seen from the table how the content of acrylic acid butyl ester in the copolymer, the viscosimetric molecular weight, given in form of the K-value, and the particle size affect the processing properties of the mixture of the two components with monomeric methacrylic acid methyl ester:

With a content of 16% acrylic acid butyl ester in the copolymer (mixtures 1 and 2) and the right K-value and sufficiently coarse particles of the copolymer, the powder can be added virtually in the desired proportion. The paste with the coarser copolymer is somewhat less advantageous during spatulating, it is initially moist, "sugary"; both mixtures set somewhat slowly because the content of acrylic acid butyl ester is near the lower limit; when the paste can be kneaded, it is at first slightly moist and usually somewhat inhomogeneous, but it remains workable for over one hour. The two mixtures approximately characterise the lower limit of the chosen range in respect of the content of acrylic acid butyl ester in the copolymer and its molecular weight. The mixture 3 has a somewhat higher content of acrylic acid butyl ester, but a very coarse particle size. The powder is excellent for strewing in, but at first very soft and tacky during spatulating; when the finished paste has become detached from the crucible wall, it is initially moist. In this case, the grain is rather coarse in view of the low K-value; the material therefore further characterises the existing limits. Inversely, the experiment 5 shows the effect of too fine a particle size of the copolymer; the powder cannot be automatically added in the desired proportion. As the molecular weight increases (mixtures 4, 6, 7, 8, 9 with K values 80.6, 82.5, 83.7, 87.2, 88.3) the particle size of the copolymer may become increasingly coarse. In all cases, the addition properties are satisfactory, the mass can be easily spatulated and rapidly yields a homogeneous paste which soon loses its residual tackiness and remains workable for over one hour. Only in the mixture 9, the particles are already rather too fine with regard to the comparatively high K-value, the powder is already difficult to strew in, tighter during spatulating, and it yields a paste which is initially rough on the outside. In the mixtures 10 and 11, even the coarser particles of the copolymer are no longer sufficient; the K-value lies beyond the acceptable range; the paste is rough at first, then dries rapidly and is no longer usable after 40 minutes. The mixture 12 with a K-value of 95.3 and 34% of particles above 100μ can no longer be strewn in, it is already somewhat tight for processing; the mixture 13 with the K-value 120 is far beyond the limits under discussion. The mixture 14 is an example of a mixture of two different acrylic acid esters.

If the processing properties at the mixture ratio of 72.5 parts by weight of copolymer to 72.5 parts by weight of homopolymer are compared with those at the mixture ratio of 25:75, the powder of the former exhibits slightly poorer strewing properties throughout; on the other hand, the paste is usually somewhat tighter during spatulating but it is equally smooth and equally workable if the other conditions are within the defined limits.

With a predetermined homopolymer and a copolymer the essential properties of which are determined by the patent claim, it is thus still possible to achieve a certain improvement within these limits in one series with a modified mixture ratio between the homopolymer and the copolymer.

EXAMPLE 4

72.5 parts by weight of a bead polymer of pure methacrylic acid methyl ester with the K-values and sieve analyses given in the table are mixed with 0.25 part by weight benzoyl peroxide and 27.5 parts by weight of a bead polymer which was obtained by copolymerisation of 80 parts by weight methacrylic acid methyl ester and 20 parts by weight acrylic acid butyl ester, and which has a K-value of 82.5 and the following sieve analysis:

| Per: | Percent |
|---|---|
| 125μ | 10 |
| 100μ | 22 |
| 80μ | 34 |
| 63μ | 14 |
| 40μ | 12 |
| Through 40μ | 8 |

Each time, 12 g. of the mixture is strewn into 4 g.=4.25 cc. of monomeric methacrylic acid methyl ester, the weight of the non-absorbed powder is determined, this is returned, the mixture is immediately spatulated, and the processing properties are determined.

| | | | | | | | | Processing properties (mixture ratio 72.5:27.5) | | | | |
|---|---|---|---|---|---|---|---|---|---|---|---|---|
| | | | | | | | | | Paste | | | |
| K-value of methacrylic acid methyl ester homopolymer | Sieve analysis of methacrylic acid methyl ester homopolymer per— | | | | | | Residue of added powder, g. | After addition | Detached from crucible wall and kneadable after— | Properties of finished paste | Residues of tackiness disappear after— | Paste workable at least for— |
| | 125 μ | 100 μ | 80 μ | 63 μ | 40 μ | (¹) | | | | | | |
| 1 | 80.1 | | 0 | 12 | 38 | 32 | 18 | 2.4 | Wet, dense at top | 2'30" | Smooth | 3'30" | 60' |
| 2² | 83.3 | | 0 | 16 | 24 | 36 | 24 | 2.4 | ___do___ | 2'30" | ___do___ | 4'0" | 60' |
| 3 | 88.3 | | 0 | 2 | 18 | 60 | 20 | 3.0 | ___do___ | 2'30" | ___do___ | 3'30" | 60' |
| 4² | 91.0 | | 0 | 4 | 16 | 46 | 34 | 2.5 | ___do___ | 2'30" | ___do___ | 3'30" | 60' |
| 5 | 91.8 | 0 | 14 | 30 | 20 | 20 | 16 | 1.0 | Somewhat wet | 2'50" | Initially briefly somewhat moist, then smooth. | 4'0" | 60' |

¹ Through 40μ.
² The polymers contain 2.5% phthalic acid-n-dibutylester as plasticiser.

Re: Example 4

The table shows the effect caused by a modification of the properties of the admixed homopolymer of the methacrylic acid methyl ester, taking as an example a mixture with a copolymer of methacrylic acid methyl ester with acrylic acid butyl ester which is covered by the patent claim in respect of the composition of the monomer, the K-value and the sieve analysis.

The mixtures 1, 2, 3 and 4 contain finely divided homopolymers of methacrylic acid methyl ester with increasing molecular weights corresponding to the K-values 80.1, 83.3, 88.3 and 91.0, which are within the claimed range in respect of the K-value but must be considered too fine with regard to the sieve analysis. In all cases, the powder mixture cannot be strewn into the monomeric methacrylic acid methyl ester in the desired proportion; but otherwise the paste becomes detached from the crucible wall and kneadable after the desired time, it rapidly loses its tackiness and remains workable for a sufficient period of time. Only when the homopolymer becomes appreciably coarser as in mixture 5 containing more than 50% of particles above 63μ, the addition properties are sufficiently improved without a deterioration of the other properties of the paste.

EXAMPLE 5

72.5 parts by weight of a bead polymer of pure methacrylic acid methyl ester with a K-value of 91.8 and the sieve analysis:

| Per: | Percent |
|---|---|
| 125μ | 0 |
| 100μ | 14 |
| 80μ | 30 |
| 63μ | 20 |
| 40μ | 20 |
| Through 40μ | 16 | are mixed with 0.25 part by weight benzoyl peroxide and 27.5 parts by weight of a bead-shaped copolymer of 80 parts by weight methacrylic acid methyl ester and 20 parts by weight acrylic acid ethyl ester with a K-value of 82.1 and the sieve analysis:

| Per: | Percent |
|---|---|
| 125μ | 52 |
| 100μ | 20 |
| 80μ | 18 |
| 63μ | 4 |
| 40μ | 4 |
| Through 40μ | 2 | which was previously sieved through a 150μ fabric.

A weighed amount of 12 g. of the mixture can be completely strewn into 4 g.=4.25 cc. of monomeric methacrylic acid methyl ester without leaving a residue. When spatulated, the mass remains at first moist ("sugary") without cohesion; it then sets well, is kneadable after 2′ 50″, but initially inhomogeneous and moist, it also remains somewhat softer and more tacky than would be desirable. The residues of tackiness disappear after 5′30″; the mass is still readily workable after one hour.

If there are correspondingly used 12 g. of a mixture of 62.5 parts by weight of the homopolymer of methacrylic acid methyl ester mentioned above, 10 parts by weight of finely divided bead polymer of pure methacrylic acid methyl ester with a K-value of 90.8 and the sieve analysis

| Per: | Percent |
|---|---|
| 80μ | 0 |
| 63μ | 2 |
| 40μ | 12 |
| 32μ | 52 |
| Through 32μ | 34 | and 27.5 parts by weight of the aforesaid copolymer with acrylic acid ethyl ester, then there remains a powder residue of 0.1 g. which is returned. When spatulated, the mass is not moist (not "sugary"), it sets well, is kneadable after 2′20″, it is not wet or inhomogeneous but immediately smooth and supple. The residual tackiness disappears after 4′30″; the mass is still readily workable after one hour.

72.5 parts by weight of the aforesaid homopolymer of methacrylic acid methyl ester with a K-value of 91.8 and the sieve analysis

| Per: | Percent |
|---|---|
| 125μ | 0 |
| 100μ | 14 |
| 80μ | 30 |
| 63μ | 20 |
| 40μ | 20 |
| Through 40μ | 16 | are mixed with 0.25 part by weight benzoyl peroxide and 27.5 parts by weight of the same bead-shaped copolymer of 80 parts by weight methacrylic acid methyl ester and 20 parts by weight acrylic acid ethyl ester with a K-value of 82.1, which was previously sieved through a fabric with a mesh width of 125μ, the sieve analysis now giving the following values:

| Per: | Percent |
|---|---|
| 125μ | 2 |
| 100μ | 42 |
| 80μ | 36 |
| 63μ | 10 |
| 40μ | 8 |
| Through 40μ | 2 |

A weighed amount of 12 g. of the mixture strewn into 4 g.=4.25 cc. of monomeric methacrylic acid methyl ester gives a non-absorbed residue of the powder of 0.7 g. which is returned. When spatulated, the mass is initially hardly moist, it is easy and soft ot spatulate, kneadable after 2′30″, initially still homogeneous, rough on the outside, then rather smooth; it is moderately tacky for 5′0″ and still readily workable after one hour.

If there are correspondingly used 12 g. of a mixture of 62.5 parts by weight of the above homopolymer of methacrylic acid methyl ester, 10 parts by weight of a finely divided bead polymer of pure methacrylic acid methyl ester with a K-value of 90.8 and the sieve analysis

| Per: | Percent |
|---|---|
| 80μ | 0 |
| 63μ | 2 |
| 40μ | 12 |
| 32μ | 52 |
| Through 32μ | 34 | and 27.5 parts by weight of a copolymer sieved through a 125μ fabric, then the non-absorbed residue of the powder amounts to 0.1 g.; when spatulated, the mass is initially hardly moist, it then becomes appreciably tighter, though still easy, to spatulate, it is kneadable after 2′15″, hardly inhomogeneous, very rapidly smooth and supple and also less tacky; the tackiness is no longer noticeable after 4′30″, and the paste remains workable for one hour.

EXAMPLE 6

72.5 parts by weight of a bead polymer of pure methacrylic acid methyl ester with a K-value of 91.8 and the sieve analysis

| Per: | Percent |
|---|---|
| 125μ | 0 |
| 100μ | 14 |
| 80μ | 30 |
| 63μ | 20 |
| 40μ | 20 |
| Through 40μ | 16 | are mixed with 27.5 parts by weight of a bead-shaped copolymer of 82 parts by weight methacrylic acid methyl ester and 18 parts by weight acrylic acid butyl ester with a K-value of 80.4 and the sieve analysis

| Per: | Percent |
|---|---|
| 160μ | 46 |
| 125μ | 22 |
| 100μ | 8 |
| 80μ | 10 |
| 63μ | 4 |
| 40μ | 5 |
| μ | 5 | and with 0.25 part by weight benzoyl peroxide. 12 g. of this mixture are strewn into 4 g.=4.25 cc. of monomeric methacrylic acid methyl ester; there remains a residue of 0.1 g. which is returned after weighing. When spatulated, the mass is initially soft and moist, due to the comparatively low molecular weight and the excessively coarse grain of the copolymer. The paste is kneadable after 3′30″, it is inhomogeneous and moist at first and somewhat granular, but it soon becomes smooth and homogeneous, loses the residual tackiness after 6 minutes and remains workable for over one hour.

If the sample used consists of 12 g. of a mixture of 57.5 parts by weight of the aforesaid homopolymer of methacrylic acid methyl ester, 15 parts by weight of a finely divided bead polymer of pure methacrylic acid methyl ester with a K-value of 90.8 and the sieve analysis

| Per: | Percent |
|---|---|
| 80µ | 0 |
| 63µ | 2 |
| 40µ | 12 |
| 32µ | 52 |
| Through 32µ | 34 | and 27.5 parts by weight of the said copolymer, then there also remains a very low residue of 0.05 g. after strewing in; however, the mass is wet and tacky only for a very short time, it is kneadable after 2′45″, hardly inhomogeneous and moist, it has no granular feel but is smooth and supple. It loses the residual tackiness after 4′45″ and remains workable for over one hour.

EXAMPLE 7

72.5 parts by weight of a bead polymer of pure methacrylic acid methyl ester with a K-value of 91.8 and the sieve analysis

| Per: | Percent |
|---|---|
| 125µ | 0 |
| 100µ | 14 |
| 80µ | 30 |
| 63µ | 20 |
| 40µ | 20 |
| Through 40µ | 16 | are mixed with 27.5 parts by weight of a bead-shaped copolymer of 80 parts by weight methacrylic acid methyl ester and 20 parts by weight acrylic acid butyl ester with a K-value of 80.6 and the sieve analysis

| Per: | Percent |
|---|---|
| 160µ | 2 |
| 125µ | 26 |
| 100µ | 30 |
| 80µ | 26 |
| 63µ | 8 |
| 40 | 6 |
| µ | 2 | and with 0.25 parts by weight benzoyl peroxide. 12 g. of the mixture are strewn into 4 g.=4.25 cc. of monomeric methacrylic acid methyl ester; 0.8 g. of the powder are not absorbed and returned after weighing. The mass can be evenly spatulated, the paste soon becomes detached from the crucible wall and is kneadable after 2′45″, although at first inhomogeneous for a short time, but it soon becomes smooth. It soon becomes more solid and loses the residual tackiness after 4′30″, and it is still soft and kneadable after 60 minutes.

If the above mixture is replaced with a mixture consisting of 62.5 parts by weight of the aforesaid homopolymer of methacrylic acid methyl ester, 10 parts by weight of a finely divided bead polymer of pure methacrylic acid methyl ester with a K-value of 90.8 and the sieve analysis

| Per: | Percent |
|---|---|
| 80µ | 0 |
| 63µ | 2 |
| 40µ | 12 |
| 32µ | 52 |
| Through 32µ | 34 | and with 27.5 parts by weight of the aforesaid copolymer, then a residue of 0.4 g. of powder remains after strewing in; the mass can be easily and evenly spatulated and becomes tighter more rapidly. The paste is kneadable after 2′20″, nicely smooth and supple, the residual tackiness disappears already after 3′0″, and the paste remains excellently workable for one hour.

EXAMPLE 8

75 parts by weight of a bead polymer of pure methacrylic acid methyl ester with a K-value of 91.8 and the sieve analysis

| Per: | Percent |
|---|---|
| 125µ | 0 |
| 100µ | 14 |
| 80µ | 30 |
| 63µ | 20 |
| 40µ | 20 |
| Through 40µ | 16 | are mixed with 25 parts by weight of a bead-shaped copolymer of 80 parts by weight methacrylic acid methyl ester and 20 parts by weight acrylic acid butyl ester with a K-value of 87.2 and the sieve analysis

| Per: | Percent |
|---|---|
| 160µ | 2 |
| 125µ | 34 |
| 100µ | 26 |
| 80µ | 24 |
| 63µ | 8 |
| Through 63µ | 6 | and with 0.25 part by weight benzoyl peroxide.

12 g. of the mixture are strewn into 4 g.=4.25 cc. of monomeric methacrylic acid methyl ester; 0.9 g. of the powder are not absorbed but returned after weighing. The mass is somewhat wet at the bottom of the crucible and the upper layer is dense. It can be easily spatulated; the paste is kneadable after 2′30″, somewhat inhomogeneous for a short moment, rough outside and soft inside, but is rapidly becomes smooth. The residual tackiness disappears after 6′0″, and the paste remains workable for over one hour.

If the above mixture is replaced with a mixture consisting of 65 parts by weight of the aforesaid homopolymer of methacrylic acid methyl ester, 10 parts by weight of a finely divided bead polymer of pure methacrylic acid methyl ester with a K-value of 90.8 and the sieve analysis

| Per: | Percent |
|---|---|
| 80µ | 0 |
| 63µ | 2 |
| 40µ | 12 |
| 32µ | 52 |
| Through 32µ | 34 | and with 25 parts by weight of the aforesaid copolymer, then a residue of 0.6 g. of powder remains after strewing in; the mass is noticeably tighter but readily spatulated, it is kneadable after 2′10″; in spite of the short mixing time, it is only very slightly inhomogeneous and soon becomes smooth and particularly supple. The residual tackiness disappears after 5′0″, and the paste remains workable for one hour.

EXAMPLE 9

75 parts by weight of a bead polymer of pure methacrylic acid methyl ester with a K-value of 91.8 and the sieve analysis

| Per: | Percent |
|---|---|
| 125µ | 0 |
| 100µ | 14 |
| 80µ | 30 |
| 63µ | 20 |
| 50µ | 20 |
| Through 40µ | 16 | are mixed with 0.25 part by weight benzoyl peroxide and 25 parts by weight of a bead polymer which was obtained by copolymerisation of 80 parts by weight methacrylic acid methyl ester and 20 parts by weight 2-ethyl-hexyl-acrylic acid ester and has a K-value of 88.3 and the following sieve analysis Per: Percent
125μ _____ 20
100μ _____ 30
80μ _____ 28
63μ _____ 10
40μ _____ 8
Through 40μ _____ 4

12 g. of the mixtures are strewn into 4 g.=4.25 cc. of monomeric methacrylic acid methyl ester; 0.8 g. of the powder are not absorbed by the liquid but returned after weighing. Spatulating starts at once; it is easy and smooth, and the mass soon becomes stringy. The paste is detached from the crucible wall and kneadable after 2′50″. It is initially very slightly inhomogeneous, rough outside and somewhat moist, but soon smooth and homogeneous. The residual tackiness disappears after 5′30″, and the paste remains workable for at least one hour.

If there are correspondingly used 12 g. of a mixture of 65 parts by weight of the aforesaid homopolymer of methacrylic acid methyl ester, 10 parts by weight of a bead polymer of pure methacrylic acid methyl ester with a K-value of 90.8 and the sieve analysis Per: Percent
80μ _____ 0
63μ _____ 0
40μ _____ 12
32μ _____ 52
Through 32μ _____ 34 and 25 parts by weight of the aforesaid copolymer with acrylic acid 2-ethyl-hexyl ester, then there remains a small residue of 0.2 g. of non-absorbed powder. The mass is somewhat tighter when spatulated, but smooth. The paste is kneadable already after 2′20″, it is neither inhomogeneous nor moist but smooth and supple. The residual tackiness disappears after 5′0″, and the paste is again workable for at least one hour.

If the mixture ratio is 72.5 parts by weight of the first-mentioned homopolymer of methacrylic acid methyl ester to 27.5 parts by weight of the copolymer with 2-ethyl-hexyl-acrylic acid ester, instead of 75:25 parts by weight, then the residue after strewing in amounts to 0.5 g.; the mass is somewhat tighter when spatulated, it is kneadable after 2′30″, less in homogeneous and moist, smooth; the residual tackiness disappears after 4′15″, and the paste remains workable for at least one hour.

If the mixture is prepared from 62.5 parts of the first-mentioned homopolymer of methacrylic acid methyl ester, with the addition of 10 parts by weight of the finely divided homopolymer of methacrylic acid methyl ester and 27.5 parts of the copolymer with 2-ethyl-hexylacrylic acid ester, then there remains a residue after strewing in of 0.4 g.; the mass can immediately by spatulated and is stringy and viscous; it is kneadable after 2′20″, not in homogeneous or moist but immediately smooth and supple; the residual tackiness disappears after 4′0″, and the paste remains workable for one hour.

EXAMPLE 10

75 parts by weight of a bead polymer of pure methacrylic acid methyl ester with a K-value of 89.9 and the sieve analysis Per: Percent
125μ _____ 44
100μ _____ 20
80μ _____ 19
63μ _____ 7
40μ _____ 6
Through 40μ _____ 4 the patent claim, coarser than according to the patent claim, are mixed with 0.25 parts by weight benzoyl peroxide and 25 parts by weight of a bead polymer which was obtained by copolymerisation of 80 parts by weight methacrylic acid methyl ester and 20 parts by weight acrylic acid ethyl ester, and which has a K-value of 82.4 and the following sieve analysis Per: Percent
125μ _____ 3
100μ _____ 17
80μ _____ 32
63μ _____ 17
40μ _____ 20
Through 40μ _____ 11

12 g. of the mixture are strewn into 4 g.=4.25 cc. of monomeric methacrylic acid methyl ester; 0.9 g. of the powder are not absorbed but returned after weighing. When spatulated, the mass is rough and viscous. The paste becomes detached from the crucible wall after 3′15″ and is kneadable but it is inhomogeneous, rough, and has a slightly granular structure. The residual tackiness disappears after 4″, the paste remains plastic for over one hour.

If there are correspondingly used 12 g. of a mixture of 65 parts by weight of the aforesaid bead polymer of pure methacrylic acid methyl ester, 10 parts by weight of a finely divided bead polymer of pure methacrylic acid methyl ester with a K-value of 90.8 and the sieve analysis Per: Percent
80μ _____ 0
63μ _____ 2
40μ _____ 12
32μ _____ 52
Through 32μ _____ 34 and 20 parts by weight of the aforesaid copolymer with acrylic acid methyl ester, then there remains a non-absorbed residue of 0.4 g. of the powder which is returned. The mass is smooth and soft when spatulated, it is initially moist, it becomes detached from the crucible wall after 2′50″, and is kneadable. The paste is not inhomogeneous, it is initially somewhat moist but smooth and it has no granular feel. The residual tackiness disappears after 4′30″, and the paste remains workable for over one hour.

EXAMPLE 11

75 parts by weight and 72.5 parts by weight, respectively, of a bead polymer of pure methacrylic acid methyl ester with a K-value of 91.8 and the following sieve analysis:

Per: Percent
125μ _____ 0
100μ _____ 14
80μ _____ 30
63μ _____ 20
40μ _____ 20
Through 40μ _____ 16 are mixed with 0.25 part by weight benzoyl peroxide and with 25 parts by weight and 27.5 parts by weight, respectively, of a bead polymer which was obtained by copolymerisation of methacrylic acid methyl ester with methacrylic acid butyl ester. Each time, 12 g. of the mixture are strewn into 4 g.=4.25 cc. of monomeric methacrylic acid methyl ester, the weight of the non-absorbed powder is determined and this is returned; the mass is immediately spatulated, and the processing properties are determined.

| | Percent methacrylic acid butyl ester of copolymer | K-value of copolymer | Sieve analysis of copolymer per— | | | | | | Processing properties at mixture ratio 75:25 | | | | | | | Processing properties at mixture ratio 72.5:27.5 | | | | | | |
|---|---|---|---|---|---|---|---|---|---|---|---|---|---|---|---|---|---|---|---|---|---|---|
| | | | 125μ | 100μ | 80μ | 63μ | 40μ | (¹) | Residue of added powder, g. | After addition | Paste During mixing | Detached from crucible wall and kneadable after— | Properties of finished paste | Residues of tackiness disappear after— | Paste workable at least for— | Residue of added powder, g. | After addition | Paste During mixing | Detached from crucible wall and kneadable after— | Properties of finished paste | Residues of tackiness disappear after— | Paste workable at least for— |
| 1 | 35 | 97.9 | ------ | 0 | 6 | 22 | 46 | 26 | 0.9 | Slightly wet. | Easily spatulated, stringy | 2'10" | First porous and rough outside, somewhat loose, cotton wool-like, elastic. | 3'15" | 45' | 0.8 | Not wet | Not viscous not soft, readily spatulated. | 2'20" | Smooth but slightly elastic. | 4'30" | 45' |
| 2 | 40 | 82.4 | ------ | 2 | 16 | 22 | 28 | 30 | 24 | 1.0 | Wet, dense at top. | Somewhat rough and stringy. | 2'50" | First inhomogeneous, rough outside, then smooth. | 4'45" | 60' | 1.2 | Wet, dense at top. | Somewhat rough and viscous. | 3'0" | Briefly inhomogeneous then smooth. | 5'0" | 60' |
| 3 | 40 | 86.7 | ------ | 10 | 22 | 20 | 20 | 16 | 0.3 | Hardly wet. | Good, rather soft. | 2'45" | ---do--- | 5'0" | 60' | 0.3 | Hardly wet. | Somewhat stringy, good. | 2'40" | Not inhomogeneous smooth. | 5'0" | 60' |
| 4 | 40 | 88.5 | ------ | 2 | 4 | 4 | 34 | 54 | 1.6 | Very wet | Very rough, tight. | 3'0" | First very slightly inhomogeneous, rough outside, then smooth. | 4'30" | 60' | 1.4 | Wet, dense at top. | Very rough, tight, stringy. | 3'0" | First inhomogeneous, tight. | 4'15" | 60' |

¹ Through 40μ.

In the table, the mixture 3 corresponds to the demands made on optimum processing properties: The residue of the powder mixture after strewing in lies below 1 g. In the mixture 4 the molecular weight is also still in the admitted range of K-values between 76 and 95, but in the sieve analysis the proportion of copolymer particles above 80μ amounts only to 6%. This means that the copolymer has too fine a grain and the mixture can no longer be automatically added in the desired proportion. A further disadvantage of the fine grain consists in that the mass is already so solid and rough during spatulating that a homogeneous paste can not easily be obtained within the available time of 2 to 4 minutes. The mixture 2 is just within the admissible limit in respect of the addition properties, and this is also noticeable during spatulating. A coarser copolymer would have been preferable. The mixture 1 has too high a molecular weight (K value >95); consequently, the paste soon becomes elastic and does not remain workable for one hour.

EXAMPLE 12

75 parts by weight and 72.5 parts by weight, respectively, of a bead polymer of pure methacrylic acid methyl ester with the K-values and sieve analyses given in the table are mixed with 0.25 part by weight benzoyl peroxide and with 25 and 27.5 parts by weight, respectively, of a bead polymer which was obtained by copolymerisation of 60 parts by weight methacrylic acid methyl ester and 40 parts by weight methacrylic acid butyl ester and has a K-value of 86.7 and the following sieve analysis Per: Percent
125μ --------- 12
100μ --------- 10
80μ ---------- 22
63μ ---------- 20
40μ ---------- 20
Through 40μ -- 16

Each time, 12 g. of the mixture are stewn into 4 g.=4.25 cc. of monomeric methacrylic acid methyl ester, the weight of the non-absorbed powder is determined. This is returned, and the processing properties are determined.

| # | K-value of methacrylic acid methyl ester homopolymer | 125μ | 100μ | 80μ | 63μ | 40μ | (1) | Residue of added powder, g. | Processing properties at mixture ratio 75:25 ||||||| Processing properties at mixture ratio 72.5:27.5 |||||||
|---|---|---|---|---|---|---|---|---|---|---|---|---|---|---|---|---|---|---|---|---|---|---|
| | | | | | | | | | After addition | During mixing | Detached from crucible wall and kneadable after Min. | Sec. | Properties of finished paste | Residues of tackiness disappear after Min. | Sec. | Paste workable at least for min. | Residue of added powder, g. | After addition | During mixing | Detached from crucible wall and kneadable after Min. | Sec. | Properties of finished paste | Residues of tackiness disappear after Min. | Sec. | Paste workable at least for min. |
| 1 | 69.7 | 20 | 22 | 28 | 12 | | 18 | 0.0 | Not wet | Soft, soon stringy. | 2 | 45 | Inhomogeneous, moist, soft. | 8 | 0 | 60 | 0.4 | Somewhat wet. | Soft, soon stringy. | 3 | 15 | Inhomogeneous, moist. | 7 | 0 | 60 |
| 2 | 78.7 | | 6 | 6 | 16 | 46 | 26 | 1.7 | Wet, dense at top. | Tight, viscous. | 2 | 20 | Smooth. | 4 | 30 | 50 | 1.8 | Wet, dense at top. | Tight, viscous. | 2 | 30 | Smooth. | 4 | 0 | 45 |
| 3 | 89.9 | 44 | 20 | 19 | 7 | 6 | 4 | 0.6 | Not wet | Briefly wet, sets immediately. | 2 | 25 | Smooth, slightly granular. | 6 | 0 | 60 | 1.0 | Wet | Sets immediately, stringy. | 3 | 15 | Initially briefly inhomogeneous, then smooth, slightly granular. | 5 | 0 | 60 |
| 4 | 91.5 | | 8 | 24 | 22 | 24 | 22 | 0.7 | do | Good | 2 | 25 | Briefly moist, then smooth. | 4 | 45 | 60 | 0.9 | Somewhat wet. | Somewhat tighter, stringy. | 2 | 30 | Smooth. | 4 | 0 | 60 |
| 5 | 91.8 | 0 | 14 | 30 | 20 | 20 | 16 | 0.3 | Hardly wet. | Good, rather soft. | 2 | 45 | Initially very slightly inhomogeneous then smooth. | 5 | 0 | 60 | 0.3 | Hardly wet. | Somewhat stringy, good. | 2 | 40 | do | 5 | 0 | 60 |
| 6 | 102.7 | 2 | 10 | 28 | 20 | 22 | 20 | 0.7 | Somewhat wet. | Immediately stringy, somewhat tight. | 2 | 15 | Smooth. | 4 | 15 | 60 | 0.7 | Not wet | Good, not moist, not tight. | 2 | 45 | do | 4 | 45 | 60 |
| 7 | 122.0 | 2 | 8 | 39 | 23 | 16 | 12 | 2.2 | Wet, dense at top. | Rough and viscous. | 3 | 0 | do | 4 | 30 | 50 | 2.1 | Wet, dense at top. | Rough and viscous. | 2 | 35 | do | 4 | 0 | 45 |

¹ Through 40μ.

The table shows the effect cause by a modification of the properties of the admixed homopolymer of methacrylic acid methyl ester, taking as an example the mixture with a copolymer of methacrylic acid methyl ester with methacrylic acid butyl ester which is in accordance with the present invention in respect of composition of the monomer, the K-value and the sieve analysis.

The mixture 1 contains a very coarse homopolymer of methacrylic acid methyl ester with a substantial proportion of particles above 125μ and a comparatively low K-value below the claimed range. The powder is easily strewn in. The mixture also becomes kneadable within a fairly short time, but the paste is inhomogeneous, it remains moist and soft and is tacky for appreciably longer than 6 minutes. In mixture 2 there is used a homopolymer of methacrylic acid methyl ester which is too finely divided, it contains 72% of particles below 63μ. The powder mixtures cannot be added in the desired proportion, a substantial residue remains, and the time available for processing falls to below one hour in spite of the comparatively low K-value. The mixture 3 is prepared with homopolymer of methacrylic acid methyl ester the particles of which is too coarse. The paste tends initially to become inhomogeneous and then remains slightly granular. The mixtures 4, 5 and 6 with homopolymers of the K-values 91.5, 91.8 and 102.7 are within the claimed range in respect of the molecular weights as well as of the sieve analyses. The powder can automatically be strewn into the liquid in the desired proportion; the paste is readily spatulated so that it becomes soon detached from the crucible wall and kneadable; the paste is smooth, loses its residual tackiness sufficiently fast, and remains workable for at least one hour. In contrast thereto, the last mixture 7 contains a homopolymer of methacrylic acid methyl ester which is above the claimed limit in respect of the K-value; the powder can no longer be strewn in without a substantial residue, although the sieve analysis is still within the chosen range. The mass is rough during spatulating, and the paste remains workable for less than one hour.

EXAMPLE 13

75 parts by weight and 25 parts by weight, respectively, of a bead polymer of pure methacrylic acid methyl ester with a K-value of 91.8 and the following sieve analysis:

| Per: | Percent |
|---|---|
| 125μ | 0 |
| 100μ | 14 |
| 80μ | 30 |
| 63μ | 20 |
| 40μ | 20 |
| Through 40μ | 16 | are mixed with 0.25 parts by weight benzoyl peroxide and with 25 and 27.5 parts by weight, respectively, of a bead polymer obtained by copolymerisation of methacrylic acid methyl ester with methacrylic acid-n-decyl ester. Each time, 12 g. of the mixture are strewn into 4 g.=4.25 cc. of monomeric methacrylic acid methyl ester, the weight of the non-absorbed powder is determined, this is returned, the mass is spatulated and the processing properties are determined.

3,649,608

| | Percent methacrylic acid n-decyl ester in copolymer | K-value of copolymer | Sieve analysis of copolymer per— | | | | | | | Processing properties at mixture ratio 75:25 | | | | | | Processing properties at mixture ratio 72.5:27.5 | | | | | |
|---|---|---|---|---|---|---|---|---|---|---|---|---|---|---|---|---|---|---|---|---|---|
| | | | 125µ | 100µ | 80µ | 63µ | 40µ | (¹) | Residue of added powder, g. | Paste | | | | Residues of tackiness disappear after— | Paste workable at least for— min. | Paste | | | | Residues of tackiness disappear after— | Paste workable at least for— min. |
| | | | | | | | | | | After addition | During mixing | Detached from crucible wall and kneadable after— | Properties of finished paste | Min. Sec. | | Residue of added powder, g. | After addition | During mixing | Detached from crucible wall and kneadable after— | Properties of finished paste | Min. Sec. | |
| | | | | | | | | | | | | Min. Sec. | | | | | | | Min. Sec. | | | |
| 1 | 15 | 71.8 | — | 6 | 10 | 26 | 32 | 26 | 0.15 | Not wet | Does not set at first, becomes stringy only after 3′. | 5   0 | Hardly inhomogeneous, soft, not moist. | 9  — | 45 | 0.45 | Not wet | Sugary, sets slowly, soft. | 4   45 | Scabby outside, soft inside, soft and slushy. | 10  — | 40 |
| 2 | 15 | 76.9 | — | 4 | 4 | 6 | 36 | 50 | 0.0 | Wet surface | Wet and soft. | 4   0 | Initially inhomogeneous, then soft and smooth. | 7  — | 55 | 0.0 | Wet surface | Sugary, sets slowly, soft, not stringy. | 4   15 | Moist, soft, but not intermixed. | 8   30 | 45 |
|   |   | With 12.6 g. |   |   |   |   |   |   | 0.0 | ...do... | Initially moist, then soft, hardly stringy. | 3   0 | Smooth, very soft. | 5   30 | 30 | 0.0 | No wet surface | Sets slowly | 4   0 | ...do... | 8   0 | 30 |
|   |   | With 13.2 g. |   |   |   |   |   |   | 0.0 | Dry surface | Sets immediately, but soft and only moderately stringy. | 2   45 | Briefly inhomogeneous, then smooth. | 5   0 | 23 | 0.1 | ...do... | Soon stringy, but remains soft, not slushy. | 3   0 | Briefly inhomogeneous, scabby, soft inside, tacky, but more solid than with 12.6 g. |   | 25 |
| 3 | 20 | 76.3 | — | 8 | 6 | 16 | 36 | 34 | 0.0 | Surface very slightly wet. | Sets slowly, strongly stringy at 2′30″. | 4   15 | Not inhomogeneous, not moist, smooth. | 7   0 | 60 | 0.0 | Surface very slightly wet, bottom not wet. | Initially not sugary, soft, then strongly stringy. | 3   45 | Scabby outside, soft and tacky inside, moist. |   | 60 |
| 4 | 20 | 78.1 | — | 0 | 28 | 36 | 24 | 12 | 0.25 | Not wet, sugary. | Very soft and moist. | 5   0 | Soft and moist. | 7   0 | 60 | 0.1 | Not wet, slightly sugary. | Smooth and soft not at all viscous. | 3   45 | Briefly inhomogeneous, then soft. | 6   30 | 60 |
| 5 | 20 | 83.2 | — | 16 | 24 | 20 | 24 | 16 | 0.85 | Hardly wet. | Initially very soft, then stringy. | 3   0 | Initially hardly inhomogeneous then soft, smooth. | 6   0 | 60 | 1.3 | No longer wet. | Soon rough and stringy, then smooth and soft. | 2   30 | Smooth, soft. | 4   45 | 60 |
| 6 | 20 | 87.4 | 30 | 28 | 26 | 6 | 6 | 2 | 0.3 | Not wet | Initially sugary, then rather soft, not very stringy. | 3   45 | Smooth, soft. | 6   0 | 60 | 0.5 | Not wet | Initially sugary, later soft and somewhat stringy. | 3   45 | ...do... | 6   0 | 60 |
| 7 | 20 | 90.4 | — | 2 | 4 | 26 | 68 | 10 | 0.25 | ...do... | Sets immediately, stringy. | 2   25 | Initially not inhomogeneous, smooth, soft, somewhat stringy. | 4   0 | 40 | 0.3 | ...do... | At once readily spatulated, slightly stringy, but not tight. | 2   10 | Initially not inhomogeneous, smooth, soft not rough outside. | 4   15 | 45 |

See footnote at end of table.

| Percent methacrylic acid n-decyl ester in copolymer | K-value of copolymer | Sieve analysis of copolymer per— | | | | | | Residue of added powder, g. | Processing properties at mixture ratio 75:25 | | | | | | | |
|---|---|---|---|---|---|---|---|---|---|---|---|---|---|---|---|---|
| | | | | | | | | | Paste | | | | | | | Paste workable at least for min. |
| | | 125μ | 100μ | 80μ | 63μ | 40μ | (1) | | After addition | During mixing | Properties of finished paste | Detached from crucible wall and kneadable after— | | Residues of tackiness disappear after— | | |
| | | | | | | | | | | | | Min. | Sec. | Min. | Sec. | |
| 8 | 91.4 | — | 6 | 26 | 36 | 28 | 4 | 0.65 | Not wet | Sets more slowly, then very tacky and stringy, not tight. | Initially somewhat inhomogeneous, then soft, somewhat cotton-wool-like. | 2 | 55 | 4 | 45 | 40 |
| 9 | 93.9 | 62 | 20 | 12 | 2 | 2 | 2 | 0.3 | do | Initially sugary, sets slowly slightly stringy at 3′. | Initially loose and tacky, then very soft. | 5 | 0 | 7 | 30 | 25 |
| 10 | 130.0 | 78 | 10 | 8 | 2 | 3 | 1 | 1.2 | do | Cannot be combined, loose, porous, dry. | | | | | | |
| 11 | 94.2 | — | 2 | 5 | 8 | 44 | 40 | 0.4 | do | Immediately stringy but not tight, good. | Smooth, soft soon somewhat elastic. | 2 | 10 | 5 | 0 | 50 |
| 12 | 81.5 | — | 64 | 28 | 6 | 2 | 0 | 0.3 | do | Initially sugary, then wet and stringy. | Initially somewhat inhomogeneous, then soft. | 4 | 45 | 6 | 0 | 60 |
| 13 | 82.2 | 36 | 24 | 28 | — | 2 | 2 | 0.15 | do | Sets after 1′ then stringy, soft. | Smooth, soft. | 3 | 15 | 6 | 30 | 60 |
| 14 | 83.4 | — | 46 | 36 | 10 | 6 | 2 | 0.0 | do | Not quite as soft. | Not appreciably inhomogeneous, good, smooth. | 3 | 15 | 6 | 0 | 60 |
| 15 | 83.8 | 54 | 30 | 26 | 6 | 4 | 0 | 0.3 | do | Sets after 1′, then stringy soft. | Smooth, soft. | 3 | 15 | 5 | 30 | 60 |
| 16 | 93.8 | 67 | 16 | 11 | 3 | — | 3 | 0.1 | do | Sets after 1′ somewhat moist. | Smooth, very soft. | 3 | 30 | 7 | 0 | 55 |
| 17 | 103.5 | — | 14 | 36 | 20 | 20 | 10 | 0.3 | do | Not sugary, good. | Soft, porous, elastic. | 2 | 30 | 4 | 30 | 50 |
| 18 | 120 | 44 | 28 | 20 | 4 | — | 4 | 1.0 | do | Soft, loose, somewhat cotton wool-like. | Somewhat cotton wool-like, loose. | 2 | 30 | 4 | 0 | 25 |

| | Processing properties at mixture ratio 72.5:27.5 | | | | | | |
|---|---|---|---|---|---|---|---|
| | Paste | | | | | | Paste workable at least for min. |
| | Residue of added powder, g. | After addition | During mixing | Properties of finished paste | Detached from crucible wall and kneadable after— | | Residues of tackiness disappear after— | |
| | | | | | Min. | Sec. | Min. | Sec. | |
| 8 | 0.8 | Not wet | Sets immediately, slightly stringy but soft. | Smooth, soft, slightly cotton wool-like, not rough outside. | 2 | 45 | 4 | 15 | 4 |
| 9 | 0.6 | do | Initially sugary, sets slowly, stringy at 3′. | Soft, loose, less cohesion. | 4 | 30 | 8 | 0 | 25 |
| 10 | 1.15 | do | Cannot be combined, loose, porous, dry. | | | | | | |
| 11 | 0.85 | Wet, dense at top. | Stringy, tight. | Not inhomogeneous but dry, smooth, cotton wool-like. | 2 | 20 | 4 | 0 | 45 |
| 12 | 0.6 | do | Soft, gradually becomes stringy. | Initially inhomogeneous, moist, then soft. | 4 | 50 | 6 | 0 | 60 |
| 13 | 0.2 | do | Sets fast after 30′ moist, soft. | Soft | 3 | 40 | 6 | 30 | 60 |
| 14 | 0.0 | do | Not sugary, not soft. | Not inhomogeneous, rather soft, not very tacky. | 3 | 0 | 5 | 0 | 60 |
| 15 | 0.5 | do | Sets immediately, stringy. | Smooth, soft. | 3 | 5 | 6 | 30 | 60 |
| 16 | 0.0 | do | Sets after 30′, moist and soft. | Moist, very soft. | 2 | 15 | 6 | 0 | 60 |
| 17 | 0.7 | do | Rapidly stringy, fairly tight. | Soft, porous, elastic. | 2 | 0 | 3 | 45 | 40 |
| 18 | 1.1 | do | Soft, loose cotton wool-like. | Cotton wool-like, loose. | 2 | 30 | 4 | 0 | 25 |

[1] Through 41μ.

It can be seen from the table how the content of methacrylic acid-n-decyl ester in the copolymer, the viscosimetric molecular weight, given in form of the K-value, and the particle size affect the processing properties of the mixture of the two components with monomeric methacrylic acid methyl ester:

If the content of methacrylic acid-n-decyl ester in the copolymer (15%) and the K-value are too low (mixtures 1 and 2), then the powder can be added almost in the desired proportion of 3 parts by weight of powder to 1 part by weight of liquid, but the mass sets only slowly, it remains moist "sugary" for a long time; when it is spatulated, it becomes detached from the crucible wall only after 5 minutes; when kneaded, it is inhomogeneous, moist "slushy," and completely loses its tackiness only after a prolonged period of time. It is even possible to create conditions (series 2) where powder can be added in a higher proportion than 3:1 so that the surface of the paste which is initially moist becomes again dry and the mass sets better, but the processing range falls to below 30 minutes.

The content of n-decyl-methacrylate in the copolymer must be increased to the vicinity of 20 parts by weight (experiment 3 and the following), and the K-value must be brought to at least 76, preferably 80, in order to comply with the condition that less than 1 g. of residue remains when 12 g. of powder are strewn into 4 g. of monomeric methacrylic acid methyl ester; that the mass becomes kneadable after 4 minutes, that it loses its residual tackiness after about 6 to 6½ minutes, and that it remains workable for at least 60 minutes. Numbers 3 and 6 meet these demands, since also the sieve analysis is within the correct range. At a low K-value of below 80, a material in which 14% of particles are above 80μ (experiment 3, K-value 76.3; see also experiment 4, K-value 78.1) is just about usable. In this case, the comparatively fine grain permits of a tolerable processing, although the mass sets relatively slowly, due to the low molecular weight, becomes kneadable relatively late and remains moist and tacky for a long time. However, if the K-values are above 80, the sieve analysis must show at least 25% of particles above 80μ if all demands are to be met (experiments 5 and 6). When a powder with a coarser copolymer is strewn in, the mass is initially moist "sugary" for a short time, but it swells rapidly to become workable and it remains usable for at least one hour. When the molecular weight is further increased beyond K-values of 90 (mixtures 7 to 10), then the time for processing falls below one hour. Even if the grain is very coarse (experiment 9), the paste rapidly acquires a dry, loose and more or less elastic character, and finally at an extremely high molecular weight, the mass cannot be combined at all to form a useful part (experiment 10).

When the content of methacrylic acid-n-decyl ester in the copolymer is increased from 22.5 to 25% (Nos. 11 to 18), then the stated copolymers with the claimed K-values give mixtures having all the processing properties required, provided the sieve analysis shows a sufficient proportion of particles above 80μ in the copolymer. With a K-value above 90, even a very coarse grain of the copolymer (experiment 16) can no longer improve matters.

An increase of the mixture ratio of copolymer to homopolymer from 25:75 to 27.5:72.5 has throughout the effect that the residue after addition is somewhat higher, in most cases without becoming detrimental; that the mass sets somewhat more rapidly when spatulated, that the paste is somewhat less moist when kneaded and that it loses its residual tackiness somewhat sooner especially if the K-value is low; but, on the other hand, the paste becomes sooner dry and strongly rubber-like when the K-value is high. A modification of the mixture ratio between homopolymer and copolymer of the essential properties of which are determined by the claim, thus offers a certain limited scope for improvement. If the molecular weight is low and the grain too coarse, and the mass therefore sets too slowly, more copolymer will be added; inversely, less will be added, when the mass is too tight during spatulating because the molecular weight is too high or the grain is too fine.

EXAMPLE 14

75 and 72.5 parts by weight, respectively, of a bead polymer of pure methacrylic acid methyl ester with the K-values and sieve analyses given in the table are mixed with 0.25 part by weight benzoyl peroxide and with 25 and 27.5 parts by weight, respectively, of a bead polymer which was obtained by copolymerization of 75 parts by weight methacrylic acid methyl ester and 25 parts by weight methacrylic acid-n-decyl ester and has a K-value of 83.8 and the following sieve analysis.

| Per: | Percent |
|---|---|
| 125μ | 34 |
| 100μ | 30 |
| 80μ | 26 |
| 63μ | 6 |
| 40μ | 4 |
| Through 40μ | 0 |

Each time, 12 g. of the mixture are strewn into 4 g.=4.25 cc. of monomeric methacrylic acid methyl ester, the weight of the non-absorbed powder is determined, this is returned, the mass is immediately spatulated, and the processing properties are determined.

Processing properties at mixture ratio 75:25

| | 125μ | 100μ | 80μ | 63μ | 40μ | (¹) | Residue of added powder, g. | After addition | Paste During mixing | Paste Properties of finished paste | Paste Detached from crucible wall and kneadable after— Min. | Paste Detached from crucible wall and kneadable after— Sec. | Residues of tackiness disappear after— Min. | Residues of tackiness disappear after— Sec. | Paste workable at least for— min. |
|---|---|---|---|---|---|---|---|---|---|---|---|---|---|---|---|
| K-value of methacrylic acid methyl ester homopolymer | | | | | | | | | | | | | | | |
| 1.... 69.7 | 20 | 22 | 28 | 12 | ----- | 18 | 0.6 | Not wet | Moist, slushy, slightly stringy, soft. | Wet, tacky, soft. | 4 | 0 | 8 | 0 | 60 |
| 2.... 78.7 | ----- | 6 | 6 | 26 | 46 | 26 | 0.6 | Wet | Moist, somewhat stringy, soft. | Moist, soft | 2 | 45 | 5 | 30 | 50 |

Processing properties at mixture ratio 72.5:27.5

| | Residue of added powder, g. | After addition | Paste During mixing | Paste Properties of finished paste | Paste Detached from crucible wall and kneadable after— Min. | Paste Detached from crucible wall and kneadable after— Sec. | Residues of tackiness disappear after— Min. | Residues of tackiness disappear after— Sec. | Paste workable at least for— min. |
|---|---|---|---|---|---|---|---|---|---|
| 1.... | 0.6 | Not wet | Moist, slushy, soft. | Moist, soft | 3 | 15 | 7 | 0 | 60 |
| 2.... | 0.7 | Wet | Moist, somewhat stringy, soft. | Soft | 2 | 45 | 5 | 0 | 50 |

See footnote at end of table.

| K-value of methacrylic acid methyl ester homopolymer | 125µ | 100µ | 80µ | 63µ | 40µ | (¹) | Processing properties at mixture ratio 75:25 ||||||| Processing properties at mixture ratio 72.5:27.5 |||||||
|---|---|---|---|---|---|---|---|---|---|---|---|---|---|---|---|---|---|---|---|---|
| | | | | | | | Residue of added powder, g. | After addition | Paste |||| Residues of tackiness disappear after— || Paste workable at least for— min. | Residue of added powder, g. | After addition | Paste |||| Residues of tackiness disappear after— || Paste workable at least for— min. |
| | | | | | | | | | During mixing | Detached from crucible wall and kneadable after— || Properties of finished paste | Min. | Sec. | | | | During mixing | Detached from crucible wall and kneadable after— || Properties of finished paste | Min. | Sec. | |
| | | | | | | | | | | Min. | Sec. | | | | | | | | Min. | Sec. | | | | |
| 3 | 88.3 | 0 | 2 | 18 | 60 | 20 | 2.0 | Not wet | Not moist, somewhat stringy, soft. | 2 | 45 | Initially noticeably inhomogeneous, then soft, tacky. | 5 | 30 | 50 | 2.1 | Wet | Soft, not stringy. | 3 | 0 | Initially somewhat inhomogeneous, slightly tacky. | 5 | 30 | 50 |
| 4 | 89.9 | 44 | 20 | 19 | 7 | 6 | 4 | 0.7 | do | Soft, soon somewhat stringy. | 2 | 45 | Initially somewhat moist, soft, but noticeably granular. | 5 | 0 | 60 | 0.6 | Not wet | Soft, soon stringy. | 2 | 45 | Initially somewhat inhomogeneous, soft but noticeably granular. | 0 | 0 | 60 |
| 5 | 91.5 | 8 | 24 | 22 | 24 | 22 | 0.7 | do | Soft, soon stringy. | 3 | 0 | Not moist, good. | 5 | 30 | 60 | 0.6 | do | Soft, somewhat moist. | 2 | 45 | Soft | 5 | 30 | 60 |
| 6 | 91.8 | 0 | 14 | 20 | 20 | 16 | 0.35 | do | Soft, stringy. | 3 | 15 | Smooth, soft | 5 | 30 | 60 | 0.5 | do | Sets at once, stringy. | 3 | 5 | Smooth, soft | 5 | 30 | 60 |
| 7 | 102.7 | 10 | 28 | 20 | 22 | 20 | 0.3 | do | Soft, strongly stringy. | 3 | 5 | Soft, supple | 5 | 0 | 60 | 0.4 | do | Soft, strongly stringy. | 2 | 55 | Soft, supple | 5 | 30 | 60 |
| 8 | 122.0 | 2 | 8 | 23 | 16 | 12 | 1.2 | Wet | Soft, sets fast. | 2 | 35 | Soft, not moist. | 5 | 0 | 50 | 1.5 | Wet | Sets at once. | 2 | 20 | Soft, not moist. | 5 | 0 | 50 |

¹ Through 40µ.

The table shows the effect caused by a modification of the properties of the admixed homopolymer of methacrylic acid methyl ester, taking as an example the mixture with a copolymer of methacrylic acid methyl ester with methacrylic acid-n-decyl ester which is in accordance with the present invention in respect of the composition of the monomer, the K-value and the sieve analysis.

The mixture 1 contains a very coarse homopolymer of methacrylic acid methyl ester with a substantial proportion of particles above 125µ and a comparatively low K-value which is below the claimed range. The powder can easily be strewn in, but the paste is very wet during spatulating and remains moist when it has become detached from the crucible wall, and it therefore also remains tacky for a long time. The mixtures 2 and 3 contain too finely divided homopolymers of methacrylic acid methyl ester. The homopolymer with the lower K-value yields with the copolymer concerned a mixture which can still be strewn in, but the homopolymer with the higher K-value does not. In both cases the time available for processing is noticeably less than one hour. The mixture 4 with a homopolymer of methacrylic acid methyl ester which is too coarse, yields a mixture which can be strewn in and also gives the required time for processing, but the coarse particles adversely affect the structure of the paste. The mixtures 5, 6 and 7 are within the claimed range in respect of the molecular weights as well as of the sieve analyses of the homopolymers of methacrylic acid methyl ester. With the copolymers used, the processing times and the properties of the paste are optimal. In the mixture 8 the K-value of the homopolymer is already so high that the mixture with the copolymer gives too high a residue after addition, in spite of the correct sieve analysis, and the paste is no longer workable after one hour.

EXAMPLE 15

72.5 parts by weight of a bead polymer of pure methacrylic acid methyl ester with a K-value of 91.8 and the sieve analysis Per:
| | Percent |
|---|---|
| 125µ | 0 |
| 100µ | 14 |
| 80µ | 30 |
| 63µ | 20 |
| 40µ | 20 |
| Through 40µ | 16 | are mixed with 27.5 parts by weight of bead-shaped copolymer of 80 parts by weight methacrylic acid methyl ester and 20 parts by weight methacrylic acid-n-decyl ester with a K-value of 87.4 and the sieve analysis Per:
| | Percent |
|---|---|
| 125µ | 30 |
| 100µ | 28 |
| 80µ | 26 |
| 63µ | 6 |
| 40µ | 6 |
| Through 40µ | 2 |

12 g. of this mixture are strewn into 4 g.=4.25 cc. of monomeric methacrylic acid methyl ester; 0.6 g. powder are deteirmned as the residue which has not been absorbed within 30 seconds, and these are returned. When spatulated, the mass sets slowly, it becomes kneadable after 3'45", it is rather soft and smooth but remains tacky for the comparatively long time of 6'30" and, finally, it remains workable only for one hour.

If the above mixture is replaced with a mixture of 62.5 parts by weight of the aforesaid homopolymer of methacrylic acid methyl ester, 10 parts by weight of a finely divided bead polymer of pure methacrylic acid methyl ester with a K-value of 90.8 and the sieve analysis

| Per: | Percent |
| --- | --- |
| 80$\mu$ | 0 |
| 63$\mu$ | 2 |
| 40$\mu$ | 12 |
| 32$\mu$ | 52 |
| Through 32$\mu$ | 34 | and with 27.5 parts by weight of the aforesaid copolymer, then 12 g. of this mixture are absorbed by 4 g. of monomeric methacrylic acid methyl ester without a residue. During spatulating, it is noticeable that the mass has a more homogeneous consistency from the start; it is very soft, kneadable after 3'15", pleasantly smooth and homogeneous and less tacky, and it also remains workable for one hour.

We claim:

1. A process for the production of dental prostheses, which comprises mixing from 25-27 parts by weight of a liquid consisting predominantly of monomeric methacrylic acid methyl ester per 73-75 parts by weight of a polymer powder composition to form a kneadable plastic mass, placing this mass into a mold and transforming the mass into the solid state by polymerization of the monomeric component, said polymer powder composition comprising from 85-60 parts of component A and 40-15 parts of component B, component A being:
   (1) a finely divided polymer of methacrylic acid methyl ester containing 0 to 2% of a comonomer and having a K-value of 75-120 and a sieve analysis of at least 98% of particles below 125$\mu$ and more than 50% of particles above 63$\mu$; or
   (2) a mixture of said finely divided polymer of methacrylic acid methyl ester and a polymer of methacrylic acid methyl ester containing 0 to 2% of a monomer and having a K-value of 75-120 and a particle size one-fifth to one-half as large as said finely divided polymer of methacrylic acid methyl ester; or
   (3) a mixture of
      (a) a coarser polymer of methacrylic acid methyl ester containing 0 to 2% of a comonomer and having a K-value of 75-120 and a sieve analysis of at least 99% of particles below 150$\mu$ and more than 50% of particles above 63$\mu$, and
      (b) a polymer of methacrylic acid methyl ester containing 0 to 2% of a comonomer and having a K-value of 75-120 and a particle size one-fifth to one-half as large as said coarser polymer of methacrylic acid methyl ester; and
   component B being:
   (1) a copolymer of 15-30% of one or more acrylic acid esters, the balance being methacrylic acid methyl ester and 0 to 5% of a further comonomer, and having a K-value of 76-95 and a sieve analysis of at least 15% of particles above 100$\mu$; or
   (2) a copolymer of 18-30% of one or more methacrylic acid esters containing 7-14 carbon atoms in the alcohol residue, the balance comprising methacrylic acid methyl ester and 0 to 5% of a further comonomer, and having a K-value of 76-80 and a sieve analysis of at least 10% of particles above 80$\mu$, or a K-value of 80-90 and a sieve analysis of at least 25% of particles above 80$\mu$; or
   (3) a copolymer of 20-50% of one or more methacrylic acid esters containing 4-6 carbon atoms in the alcohol residue, the balance comprising methacrylic acid methyl ester and 0 to 5% of a further comonomer, and having a K-value of 76-95 and a sieve analysis of at least 15% of particles above 80$\mu$.

2. The process of claim 1, wherein the copolymer of component B is coarser than the polymer of component A.

3. The process of claim 1, wherein component A is a finely divided polymer of methacrylic acid methyl ester containing 0 to 2% of a comonomer and having a K-value of 75-120 and a sieve analysis of at least 98% of particles below 125$\mu$ and more than 50% of particles above 63$\mu$.

4. The process of claim 1, wherein component A is a mixture of a finely divided polymer of methacrylic acid methyl ester containing 0 to 2% of a comonomer and having a K-value of 75-120 and a sieve analysis of at least 98% of particles below 125$\mu$ and more than 50% of particles above 63$\mu$ and a polymer of methacrylic acid methyl ester containing 0 to 2% of a comonomer and having a K-value of 75-120 and a particle size one-fifth to one-half as large as said finely divided polymer of methacrylic acid methyl ester.

5. The process of claim 1, wherein component A is a mixture of a coarser polymer of methacrylic acid methyl ester containing 0 to 2% of a comonomer and having a K-value of 75-120 and a sieve analysis of at least 99% of particles below 150$\mu$ and more than 50% of particles above 63$\mu$, and a polymer of methacyllic acid methyl ester containing 0 to 2% of a comonomer and having a K-value of 75-120 and a particle size one-fifth to one-half as large as said coarser polymer of methacrylic acid methyl ester.

6. The process of claim 1, wherein component B is a copolymer of 15-30% of one or more acrylic acid esters, the balance being methacrylic acid methyl ester and 0 to 5% of a further comonomer, and having a K-value of 76-95 and a sieve analysis of at least 15% of particles above 100$\mu$.

7. The process of claim 1, wherein component B is a copolymer of 18-30% of one or more methacrylic acid esters containing 7-14 carbon atoms in the alcohol residue, the balance comprising methacrylic acid methyl ester and 0 to 5% of a further comonomer, and having a K-value of 76-80 and a sieve analysis of at least 10% of particles above 80$\mu$, or a K-value of 89-90 and a sieve analysis of at least 25% of particles above 80$\mu$.

8. The process of claim 1, wherein component B is a copolymer of 20-50% of one or more methacrylic acid esters containing 4-6 carbon atoms in the alcohol residue, the balance comprising methacrylic acid methyl ester and 0 to 5% of a further comonomer, and having a K-value of 76-95 and a sieve analysis of at least 15% of particles above 80$\mu$.

9. The process of claim 1, wherein there is 80 to 70 parts of component A per 20-30 parts of component B.

10. The process of claim 1, wherein the polymers and copolymers are bead-shaped.

11. The process of claim 3, wherein the K-value of the finely divided polymer is from 80 to 100.

12. The process of claim 4, wherein said finely divided polymer constitutes 50-95% of said mixture.

13. The process of claim 5, wherein said finely divided polymer constitutes 50-95% of said mixture.

14. The process of claim 6, wherein the copolymer contains 20-25% of said acrylic acid esters.

15. The process of claim 6, wherein the alcohol residues of said acrylic acid esters contain from 1-8 carbon atoms.

16. The process of claim 6, wherein said acrylic acid ester is methyl, ethyl, butyl or 2-ethylhexyl acrylate.

17. The process of claim 6, wherein the copolymer has not more than 80% of the particles above 100$\mu$.

18. The process of claim 7, wherein the copolymer contains 20–25% of said methacrylic acid esters containing 7–14 carbon atoms in the alcohol residue.

19. The process of claim 7, wherein the copolymer of K-value between 76 and 80 has at least 25% of particles above 80μ.

20. The process of claim 7, wherein the methacrylic acid ester containing 7–14 carbon atoms in the alcohol residue is methacrylic acid n-decyl ester.

21. The process of claim 8, wherein the copolymer contains 35–40% of said methacrylic acid esters containing 4–6 carbon atoms in the alcohol residue.

22. The process of claim 8, wherein the copolymer has at least 25% of particles above 80μ.

23. The process of claim 8, wherein the methacrylic acid ester containing 4–6 carbon atoms in the alcohol residue is butyl methacrylate.

References Cited

UNITED STATES PATENTS

| | | | |
|---|---|---|---|
| 3,446,875 | 5/1969 | Brückmann et al. | 260—885 |
| 3,468,977 | 9/1969 | Brückmann et al. | 260—885 |

FOREIGN PATENTS

| | | | |
|---|---|---|---|
| 760,344 | 10/1956 | Great Britain | 260—885 |

MURRAY TILLMAN, Primary Examiner

C. SECCURO, Assistant Examiner

U.S. Cl. X.R.

260—31.8 M, 901; 264—16